US006985906B2

(12) United States Patent
Yamashita

(10) Patent No.: US 6,985,906 B2
(45) Date of Patent: Jan. 10, 2006

(54) METHOD AND SYSTEM FOR MULTIDIMENSIONAL DATABASE MANAGEMENT

(75) Inventor: Nobuyuki Yamashita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 459 days.

(21) Appl. No.: 10/015,429

(22) Filed: Dec. 13, 2001

(65) Prior Publication Data

US 2002/0103807 A1 Aug. 1, 2002

Related U.S. Application Data

(63) Continuation of application No. 09/994,950, filed on Nov. 27, 2001.

(30) Foreign Application Priority Data

Feb. 1, 2001 (JP) .................................... 2001-025188

(51) Int. Cl.
G06F 17/00 (2006.01)

(52) U.S. Cl. ...................................... 707/102; 707/101

(58) Field of Classification Search ................ 707/1–10, 707/100–104.1, 200–206
See application file for complete search history.

(56) References Cited

U.S. PATENT DOCUMENTS

| 5,864,857 | A | * | 1/1999 | Ohata et al. ................. 707/100 |
| 6,163,774 | A | * | 12/2000 | Lore et al. ...................... 707/2 |
| 6,212,524 | B1 | * | 4/2001 | Weissman et al. ........... 707/101 |
| 6,473,764 | B1 | * | 10/2002 | Petculescu et al. .......... 707/102 |
| 6,542,895 | B1 | * | 4/2003 | DeKimpe et al. ............ 707/101 |
| 6,658,413 | B1 | * | 12/2003 | Reddy et al. .................. 707/8 |

* cited by examiner

Primary Examiner—Jean M. Corrielus
Assistant Examiner—Joon Hwan Hwang
(74) Attorney, Agent, or Firm—Knoble Yoshida & Dunleavy LLC

(57) ABSTRACT

The multidimensional database system automatically adds a new group in the existing layer information. Although the existing layer information does not have the corresponding layer structure information for the newly added group or members, the multidimensional database system has a flexible feature to generate the layer information for the newly added group to accommodate the addition in a logical manner.

27 Claims, 22 Drawing Sheets

FIG.8

TIME DIMENSIONAL LAYER RULE DEFINITION DATA      3110

```
#LAYER RULE :
#AFTER CHARACTER ROW CONVERSION ON MEMBER, OBTAINING LAYER INFORMATION
FROM MEMBER NAME
LEVEL10= $ MEMBER NAME
LEVEL11={
    S/¥ (.... \)0[123]/\1Q1/
    S/¥ (.... \)0[456]/\1Q2/
    S/¥ (.... \)0[789]/\1Q3/
    S/¥ (.... \)1[012]/\1Q4/
]
LEVEL12={
    S/  (.... \)../\1/
]
```

FIG.10
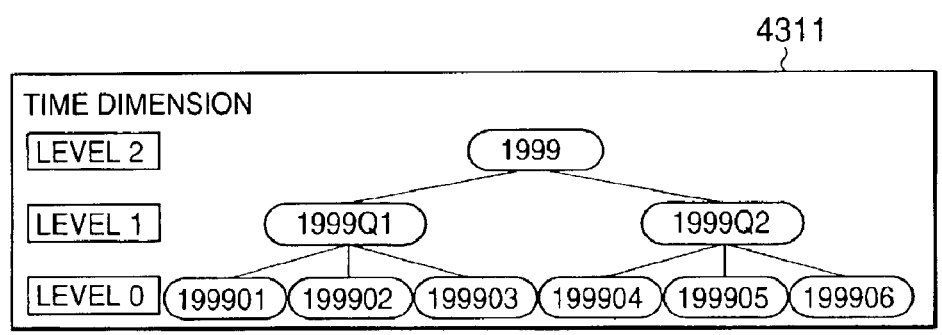
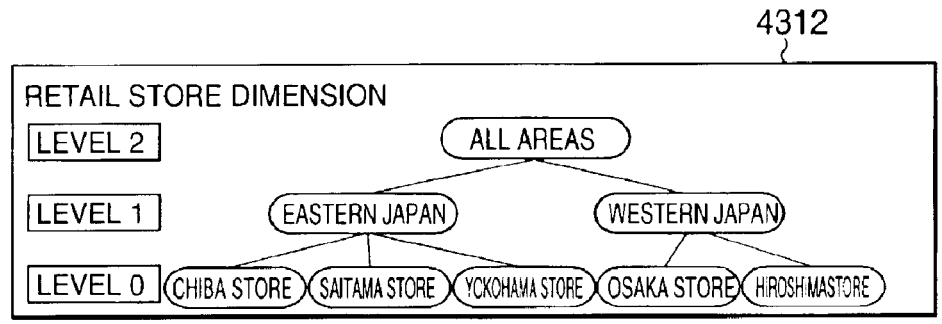
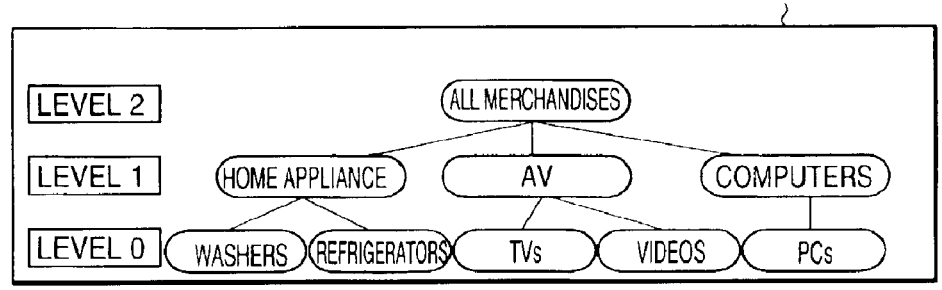

FIG.11

RETAIL STORE DIMENSIONAL LAYER RULE DEFINITION DATA  3120

```
#LAYER RULE :
#OBTAINING LAYER INFORMATION FROM CSV FORMATTED FILE

FROM FILE,CSV FILE1
LEVEL0=COLUMN 3
LEVEL1=COLUMN 2
LEVEL2=COLUMN 1
```

```
ALL AREAS,EASTERN JAPAN,CHIBA STORE
ALL AREAS,EASTERN JAPAN,SAITAMA STORE
ALL AREAS,EASTERN JAPAN,YOKOHAMA STORE
ALL AREAS,WESTERN JAPAN,OSAKA STORE
ALL AREAS,WESTERN JAPAN,HIROSHIMA STORE
```

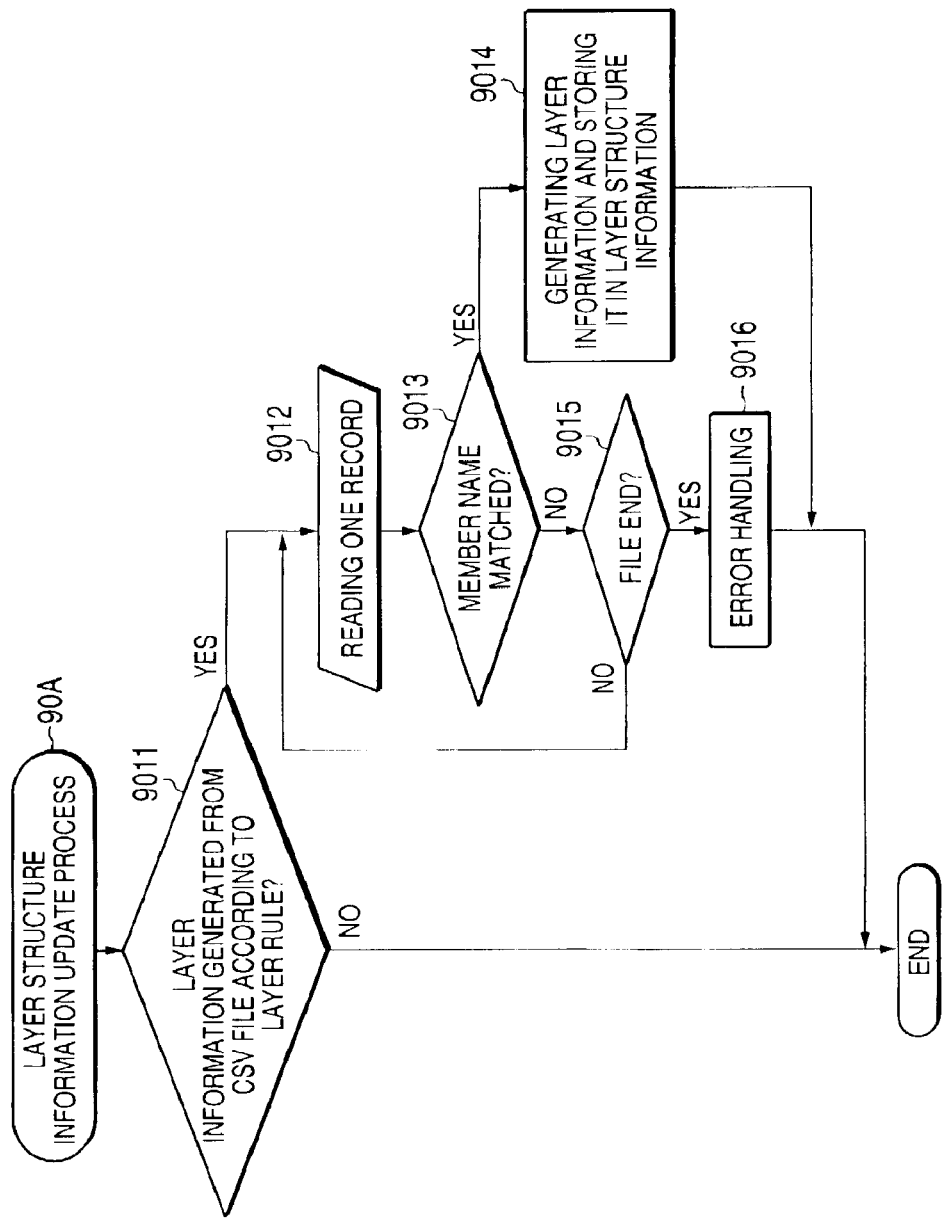

FIG.15

MERCHANDISE DIMENSIONAL LAYER RULE DEFINITION DATA    3130

```
#LAYER RULE : RDB TABLE 'PRODUCT MASTER TABLE'
#OBTAINING FROM COL1,COL2
FROM RDB TABLE 'PRODUCT MASTER TABLE'
LEVEL 0=SMALL CLASSIFICATION
LEVEL 1=LARGE CLASSIFICATION
LEVEL 2="ALL MERCHANDISE"
```

FIG.16

CONTENT OF RDB PRODUCT MASTER TABLE

| LARGE CLASSIFICATION | SMALL CLASSIFICATION |
|---|---|
| HOME APPLIANCE | WASHERS |
| HOME APPLIANCE | REFRIGERATORS |
| AV | TVs |
| AV | VIDEOS |
| COMPUTERS | PCs |

```
                                                            3301
┌─────────────────────────────────────────────────────────────┐
│ 199901, SAITAMA STORE,    TVs,            22, 2420000       │
│ 199901, OSAKA STORE,      REFRIGERATORS,  15, 1350000       │
│ 199902, HIROSHIMA STORE,  VIDEOS,         42, 2940000       │
│ 199902, SAITAMA STORE,    WASHERS,        21, 1680000       │
│ 199903, CHIBA STORE,      VIDEOS,         33, 2310000       │
│ 199904, HIROSHIMA STORE,  REFRIGERATORS,  18, 1620000       │
│ 199905, CHIBA STORE,      TVs,            45, 4950000       │
│                              ⋮                              │
└─────────────────────────────────────────────────────────────┘
```

FIG.23 PRIOR ART

| MERCHANDISE DIMENSION | TVS | | | | | | | | |
|---|---|---|---|---|---|---|---|---|---|
| UNIT DIMENSION | SALES AMOUNT | | | | | | | | |
| TIME DIMENSION | | | | 1999Q1 | | | | 1999Q2 | 1999 |
| RETAIL STORE DIMENSION | 199901 | 199902 | 199903 | | 199904 | 199905 | | | |
| CHIBA STORE | 1100000 | 330000 | 770000 | 2200000 | 1100000 | 660000 | 1760000 | 3960000 |
| SAITAMA STORE | 990000 | 990000 | 660000 | 2640000 | 660000 | 990000 | 1650000 | 4290000 |
| EASTERN JAPAN | 2090000 | 1320000 | 1430000 | 4840000 | 1760000 | 1650000 | 3410000 | 8250000 |
| OSAKA STORE | 1100000 | 1100000 | 1100000 | 3300000 | 110000 | 990000 | 1100000 | 4400000 |
| HIROSHIMA STORE | 330000 | 550000 | 1100000 | 1980000 | 1100000 | 660000 | 1760000 | 3740000 |
| WESTERN JAPAN | 1430000 | 1650000 | 2200000 | 5280000 | 1210000 | 1650000 | 2880000 | 8140000 |
| ALL AREAS | 3520000 | 2970000 | 3630000 | 10120000 | 2970000 | 3300000 | 6270000 | 16390000 |

FIG.26

RETAIL STORE DIMENSION LAYER DEFINITION DATA

```
#MAIN LAYER RULE:
#SEQUENTIALLY APPLYING SUBRULES
APPLYING SUBRULE STORE_RULE1
APPLYING SUBRULE STORE_RULE2
```
~3140

```
#SUB LAYER RULE :STORE_RULE1
#FROM CSV FILE,OBTAINING LAYER INFORMATION
FROM FILE,CSV FILE1
LEVEL 0=COLUMN 3
LEVEL 1=COLUMN 2
LEVEL 2=COLUMN 1
```
~3141

```
#SUB LAYER RULE:STORE_RULE 2:
#AFTER CHARACTER ROW CONVERSION ON RETAIL STORE, OBTAINING LAYER INFORMATION
FROM MEMBER NAME
LEVEL 0= $ MEMBER NAME
LEVEL1={
    S/\(.JAPAN\).$/\1/
}
LEVEL 2={
    ALL SALES TERRITORIES
}
```
~3142

```
199901,  EASTERN JAPAN  SAPPORO STORE, TVS,17, 1870000
199902,  HIROSHIMA STORE, VIDEOS, 42, 2940000
199903,  EASTERN JAPAN  SAPPORO STORE, REFRIGERATOR,15,1350000
```

METHOD AND SYSTEM FOR MULTIDIMENSIONAL DATABASE MANAGEMENT

This is a continuation of prior application Ser. No. 09/994,950 filed on Nov. 27, 2001 under 35 C.F.R. 1.53(b)

FIELD OF THE INVENTION

The current invention is generally related to multidimensional database management, and more particularly related to processing multidimensional data without layer or hierarchy structure information.

BACKGROUND OF THE INVENTION

A multidimensional database model contains data corresponding to a point having values in multidimensional space that is defined by a plurality of dimensions. The multidimensional database model is generally effective in analyzing the data in a multifaceted manner. Based upon a predetermined rule, it is a basic function to correspond a value of data that corresponds to one or more of points in the multidimensional space to other values corresponding to other points. For example, the above basic function is disclosed in "OLAP Practical Data Warehouse," Toyoshima and Kimura, pp 76–79, (1997); "OLAP Solutions Building Multidimensional Information Systems," Thomsen, pp. 89–104, (1997). The above described basic function is useful in constructing a database with minimally necessary data input as well as in retrieving data that has been already calculated.

In a multidimensional database model, the multidimensional space as defined by a plurality of dimensions is called "cube." The dimensions in the cube is generally expressed by a set of members that have a layer structure. A point in the multidimensional space as defined by an arbitrary member at each dimension is named "cell," and a value of the data corresponding to the cell is "a cell value." For example, using multidimensional data that represents sales units and sales amounts of products sold by a company A in Japan, the cube includes a time dimension, a retail store dimension, a merchandise dimension and a unit or measure dimensional.

To illustrate the above related example, FIG. 20 is a diagram for describing conventional layer structure information storing layer information on members for each dimension. A layer or hierarchy 4301 for the time dimension has "1999" as the highest member or the highest member in the layer or hierarchy structure, and the highest member 1999 in turn has two child members, 1999Q1 and 1999Q2. Similarly, the child member 1999Q1 has grand child members, 199901, 199902 and 199903. By the same token, the other child member 1999Q2 has grand child members, 199904 and 199905. The grand children members, 199901, 199902, 199903, 199904 and 199905 do not have any great grand children and are defined as the lowest members in the above example. The level is accordingly assigned to the members based upon a position in the layer. The lowest members are situated at Level 0 while the direct parent of the lowest members is located at Level 1. Similarly, the direct parent of Level 1 members are located at Level 2. The highest members are located at the level that is equal to the number of layers minus one.

Still referring to FIG. 20, a layer 4302 for a retail store dimension has all the sales territories or nation wide territories as the highest member. The highest member has two child members including Eastern Japan and Western Japan. Eastern Japan further owns two child members including Chiba store and Saitama store. Western Japan further owns two child members including Osaka store and Hiroshima store. Similarly, a layer 4303 for a merchandise dimension has the all merchandises as the highest member. The highest member has two child members including home appliance and audiovisual equipment (AV). Home Appliance further owns two child members including washers and refrigerators. AV further owns two child members including television sets and video equipment. Lastly, a layer 4304 in a unit dimension has two members including a number. of sales and an amount of sales but, the members in the unit dimension have no layer structure.

Now referring to FIG. 21, a diagram illustrates an example of conventional layer structure definition data. The conventional layer structure definition data 3201 through 3204 respectively define the time dimension, the retail store dimension, the merchandise dimension and the unit dimension, and each of the conventional layer structure definition data 3201 through 3204 contains a plurality of records that are separated by new line characters. Each of the records has members that are separated by commas, and the separation format is called comma separated value format (CSV). One record potentially includes all the members from the highest member to the lowest member. The conventional layer structure definition data 3201 through 3203 each is organized to list records according to the level. That is, in the above example, a record at Level 2 is followed by a record at Level 1 and then by a record at Level 0. For the layer structure definition data 3204, a record has only members at Level 0.

Now referring to FIG. 22, a diagram illustrates an example of conventional data. The data 3301 is stored-in the cube and in the above described CSV format. Each of the record includes members and corresponding cell values. In the example, each record thus contains five fields respectively for information on month/year, a retail store, a merchandise name, a number of sales and an amount of sales. The first three fields are respectively from the time dimension, the retail store dimension and the merchandise dimension. On the other hand, the last two fields are cell values representing the number of sales and the amount of sales from the unit dimension.

FIG. 23 is a diagram illustrating an exemplary display of multidimensional data. The exemplary display is a screen multidimensional data analysis on a terminal device. The horizontal axis includes members on the time dimension while the vertical axis includes members on the retail store dimension. All members from the above dimensions are displayed. On the other hand, as shown in the upper left corner of the each quarter. For example, the data representing the member 1999Q1 for the time dimension is a total value of the data 199901, 199902 and 199903. Similarly, the data representing the member, Eastern Japan for the time dimension is a total value of the data Chiba store and Saitama store. According to the previously noted dimensional layer structure, the data is a total value. One of the basic functions of the multidimensional database management system is to search the total value. To obtain more detailed data, other basic functions include a drill down function for changing a currently displayed member to its child member or a drill up function for conversely changing the currently displayed member to its parent member.

In order to respond to a search request for a total value at a high speed, other multidimensional database functions store previously calculated total values on an as-necessary basis. For example, Japanese Patent Publication Hei 9-265479 discloses techniques to search and aggregate multidimensional data at a high speed. Another example, Japanese Patent Publication Hei 11-224261 discloses storage and search techniques for data having discontinuous members in a multidimensional database. There are relatively frequent needs to store in a multidimensional database some member data that is not included in the current layer and then to analyze the data. Using the example of sales data, the above described data includes a new store to be opened and a new product to be sold, and the new data is to be included in the multidimensional data. To analyze sales data for the new products such as books and music CDs that have new titles almost on a daily basis, the multidimensional data layer needs to be updated at a high frequency.

Now referring to FIG. 24, a diagram illustrates conventional exemplary data that includes members that are not registered in the layer structure information. For example, a first field of a first record is a member 3311 that has a value of "199906." The member 3311 is unregistered in the time dimensional layer 4301 as shown in FIG. 20. Similarly, a second field of a second record is a member 3312 that has a value of "Yokohama Store." The member 3312 is unregistered in the retail store dimensional layer 4302 as shown in FIG. 20. Lastly, a third field of a third record is a member 3313 that member 3311 is unregistered in the time dimensional layer 4301 as shown in FIG. 20. Similarly, a second field of a second record is a member 3312 that has a value of "Yokohama Store." The member 3312 is unregistered in the retail store dimensional layer 4302 as shown in FIG. 20. Lastly, a third field of a third record is a member 3313 that has a value of "PCs." The member 3313 is unregistered in the merchandise dimensional layer 4303 as shown in FIG. 20. In general, there are two ways to process the above described unregistered member data. The first way is to regard the unregistered member data to be invalid, and its corresponding record that contains the unregistered member data is also regarded as being invalid. The second way is to regard the unregistered member data to be new.

The above two options are further related to the database operations. The first processing option terminates the data handling operation upon detecting a record containing any unregistered member data. Alternatively, the data handling operation skips the record to a next one according to the first processing option. The data handling operation terminates by issuing an alarm signal, and the unregistered member remains to be unregistered at the layer information. Of course, the corresponding record is not included in the database and remains excluded from analysis. On the other hand, the above second processing option registers the currently unregistered member. In registering the new member, there are two ways to find a new position in the layer. One position is created at a new location as a new member without having any relation to the existing members.

Now referring to FIG. 25, a diagram illustrates layer structure information for conventional data that includes members that are not previously registered in the layer structure information. The layer 4305 indicates that an unregistered member, "Yokohama store" is now registered as an independent member 4306 in the layer information structure 4305. The above described processing allows the incorporation of the unregistered member 4306 into the layer of the multidimensional database. Despite the incorporation of the previously unregistered member 4306, during an analysis stage, since the newly temporary until the newly added member 4306 is officially and functionally incorporated into the layer structure information.

The second processing option avoids the above described difficulty by providing a predetermined parent member for orphan members or unregistered members and assigning the unregistered members to the predetermined parent member. In layer 4307, the predetermined parent member 4308 is "others," and the previously unregistered member 4309 is "personal computers." The newly incorporated member 4309 is now linked under the predetermined parent member 4308 in this example. Because of the linkage between the members 4308 and 4309, the newly incorporated member 4309 is now included in an analysis of the layer 4307. The newly incorporated member 4309 is also reached from other members by drilling up or down. Despite the above described improvement, since the layer generally does not have a layer structure that a user may expect, the analysis often lead to unexpected results. Although Japanese Patent Publication Hei 11-102368 discloses a technique to determine a group or member name based upon a character pattern of the unregistered member, the disclosed technique is silent on adding a new group in the existing layer information.

SUMMARY OF THE INVENTION

In order to solve the above and other problems, according to a first aspect of the current invention, a multidimensional database control system, including a data storage unit for storing layer rule definition data, layer structure definition data, database data, input data, layer structure information and layer rule including rules for character-row converting a name of the member and for generating the layer information, a layer rule management unit connected to the data storage unit for managing the layer rule based upon the layer rule definition data, a layer structure information management unit connected to the data storage unit and the layer rule management unit for managing the layer structure information based upon the layer structure definition data, a multidimensional database management unit connected to the data storage unit for inputting the input data in the database data, and a layer structure information update unit connected to the layer structure information management unit and the multidimensional database management unit for receiving a command to generate layer information for the input data and for registering the layer information at the layer structure information, wherein the multidimensional database management unit enters the input data based upon the layer information.

According to the second aspect of the current invention, a multidimensional database control method, including the steps of storing layer rule definition data, layer structure definition data, database data, input data, layer structure information and layer rule for a multidimensional database, wherein the layer rule includes rules for character-row converting a name of the member and for generating the layer information, maintaining the layer rule based upon the layer rule definition data, maintaining the layer structure information based upon the layer structure definition data, inputting the input data in the database data, generating layer information for the input data based upon the layer rule, the input data and the layer structure information, registering the layer information at the layer structure information, and entering the input data in the multidimensional database based upon the layer structure information.

According to the third aspect of the current invention, a computer program for managing a multidimensional database, performing the steps of storing layer rule definition data, layer structure definition data, database data, input data, layer structure information and layer rule for a multidimensional database, wherein the layer rule includes rules for character-row converting a name of the member and for generating the layer information, maintaining the layer rule based upon the layer rule definition data, maintaining the layer structure information based upon the layer structure definition data, inputting the input data in the database data, generating layer information for the input data based upon the layer rule, the input data and the layer structure information, registering the layer information at the layer structure information, and entering the input data in the multidimensional database based upon the layer structure information.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 8 illustrates exemplary layer rule definition data for the time dimension as used in a preferred embodiment according to the current invention.

FIG. 10 is a diagram illustrating an example of the layer structure information after a modification by a preferred embodiment according to the current invention.

FIG. 11 is a diagram illustrating a portion of exemplary retail store dimensional layer rule definition in a preferred embodiment according to the current invention.

FIG. 12 is a diagram illustrating a portion of exemplary data of a CSV-formatted file that is used in a preferred embodiment according to the current invention.

FIG. 13 is a flow chart illustrating steps involved in a second preferred process of the layer structure information updating process according to the current invention.

FIG. 15 is a diagram illustrating a portion of merchandise dimensional layer rule definition data that is used in the third preferred embodiment according to the current invention.

FIG. 16 is a diagram illustrating an exemplary RDB product master table for the RDB that is used in the third preferred embodiment according to the current invention.

FIG. 22 is a diagram illustrating an example of conventional data.

FIG. 23 is a diagram illustrating an exemplary display of multidimensional data.

FIG. 26 is a diagram illustrating a portion of retail store dimensional layer rule definition data that is used in the fifth preferred embodiment according to the current invention.

FIG. 27 is a diagram illustrates a portion of data that is to be stored in the multidimensional database in the fifth preferred embodiment according to the current invention.

DETAILED DESCRIPTION OF THE PREFERRED EMBODIMENT(S)

Figure 1:
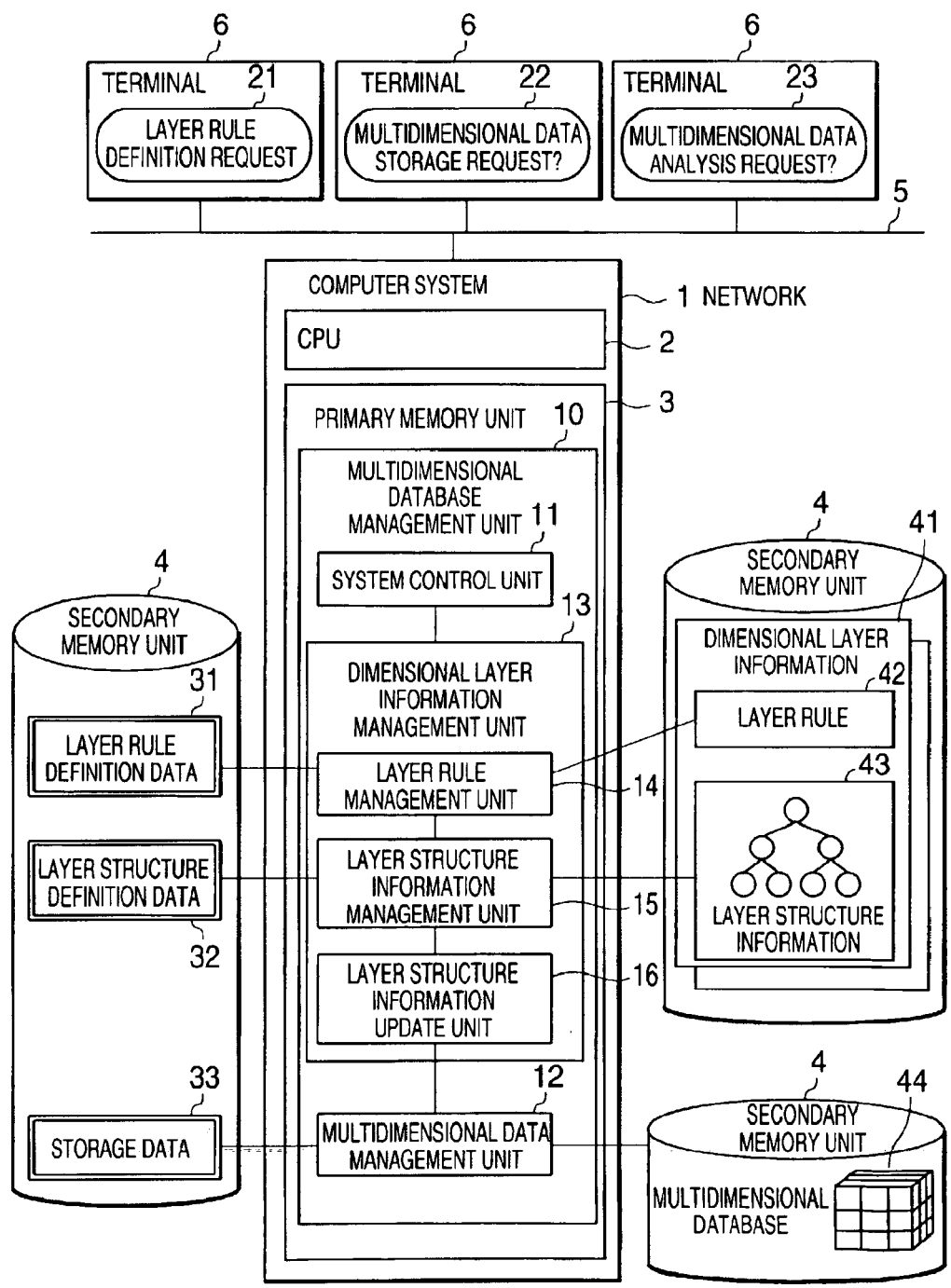
FIG. 1 is a diagram illustrating a preferred embodiment of the multidimensional database processing system according to the current invention.

Referring now to the drawings, wherein like reference numerals designate corresponding structures throughout the views, and referring in particular to FIG. 1, a diagram illustrates a preferred embodiment of the multidimensional database processing system according to the current invention. The multidimensional database processing system includes a computer system 1 that includes a central processing unit (CPU) 2, a main memory unit 3, a secondary or external memory unit 4 such as magnetic disks and a plurality of terminals 6 that are connected by a network 5. A multidimensional database management unit 10 includes a system control unit 11, a multidimensional data system according to the current invention. In the specification of the current application, the term, "layer" is interchangeably used with the term, "hierarchy" or "hierarchical" to have the substantially identical meaning. Similarly, the terms, "character row conversion" and "character string replacement" are interchangeably used in the current application. The multidimensional database processing system includes a computer system 1 that includes a central processing unit (CPU) 2, a main or primary memory unit 3, a secondary or external memory unit 4 such as magnetic disks and a plurality of terminals 6 that are connected by a network 5. A multidimensional database management unit 10 includes a system control unit 11, a multidimensional data management unit 12, a dimensional layer or hierarchy information management unit 13, a layer or hierarchy rule management unit 14, a layer or hierarchy structure information management unit 15 and a layer or hierarchy structure information update unit 16. The multidimensional database management unit 10 exists in the main memory unit 3 and includes the system control unit 11, the multidimensional data management unit 12 and the dimensional layer information management unit 13. The system control unit 11 controls the system in general. In particular, the system control 11 receives a layer rule definition request 21, a multidimensional data storage request 22 and a multidimensional data analysis request 23 and sends the requests 21, 22 and 23 to the multidimensional data management unit 12 and the dimensional layer information management unit 13. The system control 11 subsequently sends the processed results back to the requested terminals 6. The multidimensional data management unit 12 generally manages a multidimensional database 44 in an external or secondary memory unit 4. The multidimensional data management unit 12 has a first function to read storage data 33 and to store it in the multidimensional database 44, a second function to search in the multidimensional database 44 and to return the multidimensional data as well as a third function to return the data that is specified for an analysis by the search range in the multidimensional database 44.

Still referring to FIG. 1, the dimensional layer information management unit 13 further includes the layer rule management unit 14, the layer structure information layer rule 42 if layer information on the specified member is not registered at the layer structure information 43. The layer structure information management unit 15 further inputs the layer rule 42 and the above specified member and instructs the layer structure information update unit 16 to generate the layer information. The layer structure information management unit 15 returns the generated information to the above requested unit. In response to a request to generate the layer information for the above specified member from the layer structure information management unit 15, the layer structure information update unit 16 stores the generated layer structure information at the layer structure information 43 according to the layer rule 42 and returns the generated layer structure information to the layer structure information management unit 15.

Computer programs function as the multidimensional database management unit 10, the system control unit 11, the multidimensional data management unit 12, the dimensional layer information management unit 13, the layer rule management unit 14, the layer structure information management unit 15 and the layer structure information update unit 16 in the computer system 1. The above computer programs are stored in recording media such as CD-ROM and magnetic disks and are loaded in memory before execution. The recording media include media other than CD-ROM.

Figure 2:
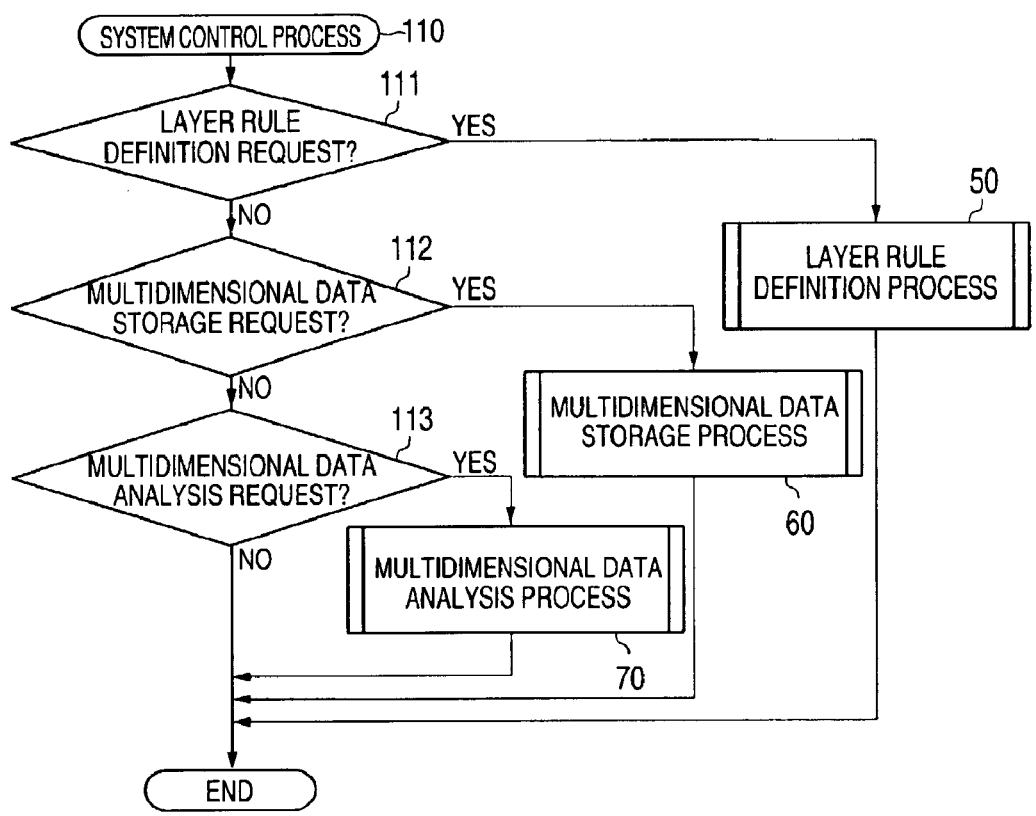
FIG. 2 is a flow chart illustrating steps involved in a preferred process of the system control unit 11 according to the current invention.

Now referring to FIG. 2, a flow chart illustrates steps involved in a preferred process of the system control unit 11 according to the current invention. The system control unit 11 receives request inputs from the user via the terminal 6 in a system control process 110. In general, the inputted requests are sequentially grouped into separate groups. In a step 111, it is determined whether or not the inputted requests are layer rule definition requests. If it is, a layer rule definition process is read in and performed in a step 50. On the other hand, if it is determined that the inputted requests are not layer rule definition requests in the step 111, it is further determined whether or not the inputted requests are multidimensional data storage requests in a step 112. If it is, a multidimensional data storage process is read in and performed in a step 60. On the other hand, if it is determined that the inputted requests are not multidimensional data storage requests in the step 112, lastly it is determined whether or not the inputted requests are multidimensional data analysis requests in a step 113. If it is, a multidimensional data analysis process is read in and performed in a step 70 and the preferred process terminates. Otherwise, the preferred process also terminates.

Figure 3:
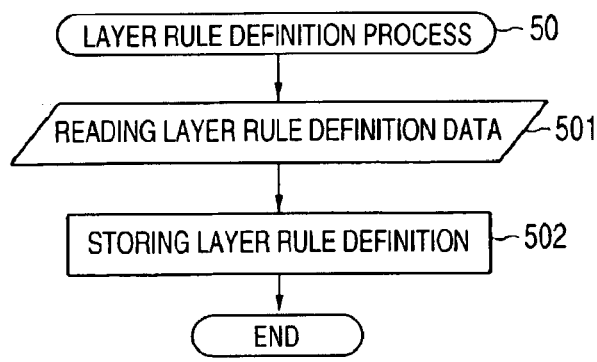
FIG. 3 is a flow chart illustrating steps involved in a preferred process of the layer rule definition process according to the current invention.

Now referring to FIG. 3, a flow chart illustrates steps involved in a preferred process of the layer rule definition process 50 according to the current invention. In a step 501, the layer rule management unit 14 reads from the terminal 6 the specified layer structure rule definition data 31. In a step 502, the layer rule management unit 14 stores the specified layer structure rule definition data 31 in the external memory unit 4. When the specified layer structure rule definition data 31 as shown in FIG. 8 is inputted, the inputted data 31 is registered in the layer rule 42. The registered layer rule 42 is later used when the data includes an unregistered member.

Figure 4:
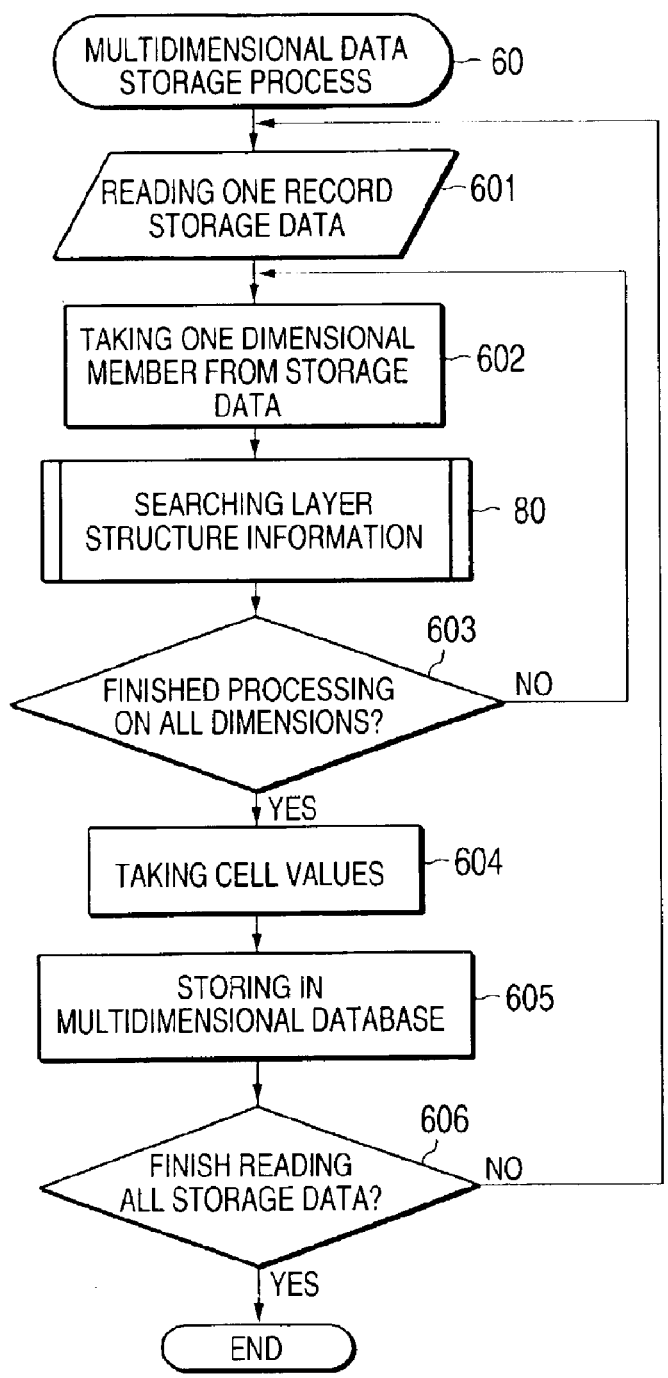
FIG. 4 is a flow chart illustrating steps involved in a preferred process of the multidimensional data storage process according to the current invention.

Now referring to FIG. 4, a flow chart illustrates steps involved in a preferred process of the multidimensional data storage process 60 according to the current invention. In a step 601, the multidimensional data management unit 12 reads one record of the data 33 that is specified by an input from the terminal unit 6. In a step 602, a member on one dimension is separated from the above record. The separated member from the step 602 is inputted into a layer structure information search process 80 so that the corresponding layer information is obtained. In a step 603, it is determined whether or not a member of every dimension is processed. If not every dimension has been processed, the preferred process returns to the step 602. On the other hand, if every dimension has been processed, in a step 604, a cell value is obtained from the cell value field in the record. In a step 605, the layer information from the step 80 and the cell value from the step 604 are combined to provide multidimensional data to be stored in the multidimensional database 44. Lastly, it is determined whether or not every record is processed in a step 606. If every record is processed, the preferred process terminates. On the other hand, if any record remains unprocessed, the preferred process returns to the step 601 to repeat the above described process.

Figure 5:
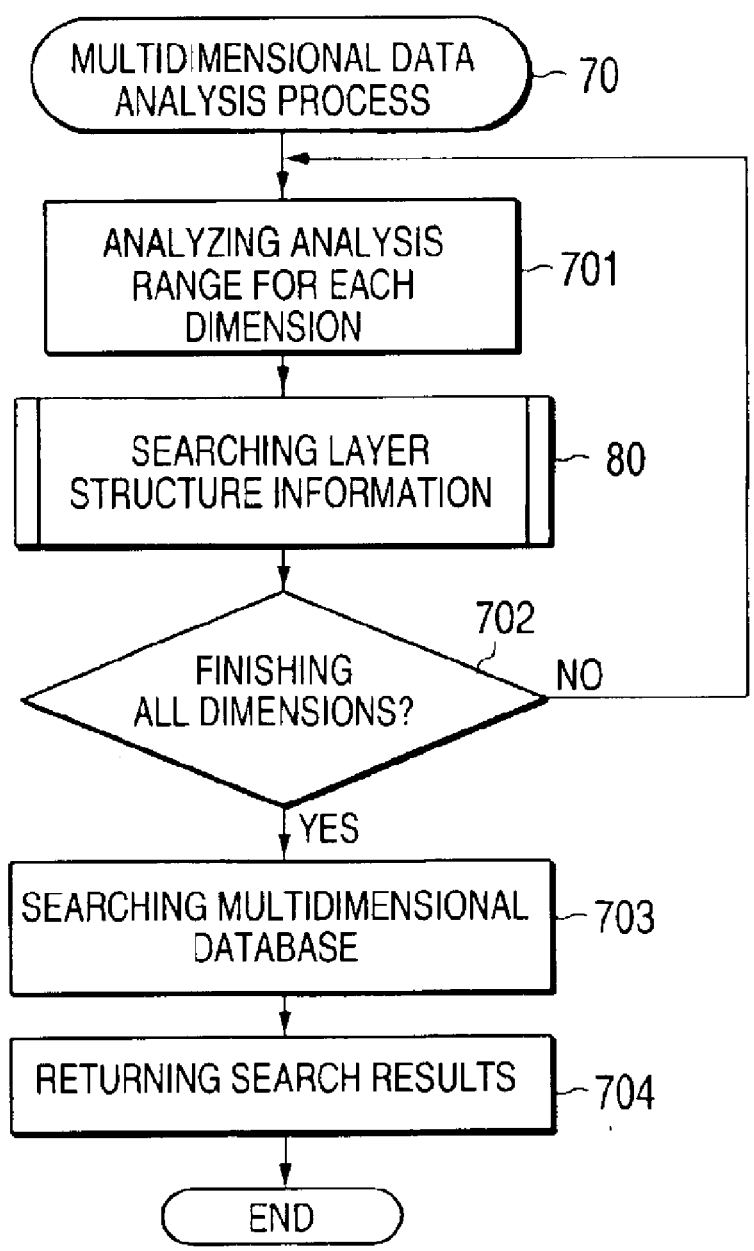
FIG. 5 is a flow chart illustrating steps involved in a preferred process of the multidimensional data analysis process according to the current invention.

Now referring to FIG. 5, a flow chart illustrates steps involved in a preferred process of the multidimensional data analysis process 70 according to the current invention. In a step 701, an analysis range is inputted from the user via the terminal unit 6, and the multidimensional data management unit 12 performs an analysis within the specified range. As a result of the analysis, a member is obtained for the above dimension. In a step 80, the searching layer structure information process is called in for the member from the step 701 to obtain the corresponding layer information. In a step 702, it is determined whether or not every dimension is processed. If not every dimension has been processed, the preferred process returns to the step 701 to repeat the above described steps. On the other hand, if every dimension has been processed, in a step 703, the multidimensional database 44 is searched according to the layer information that is obtained in the step 80. Lastly, in a step 704, the search results from the step 703 are returned to the user via the terminal unit 6.

Figure 6:
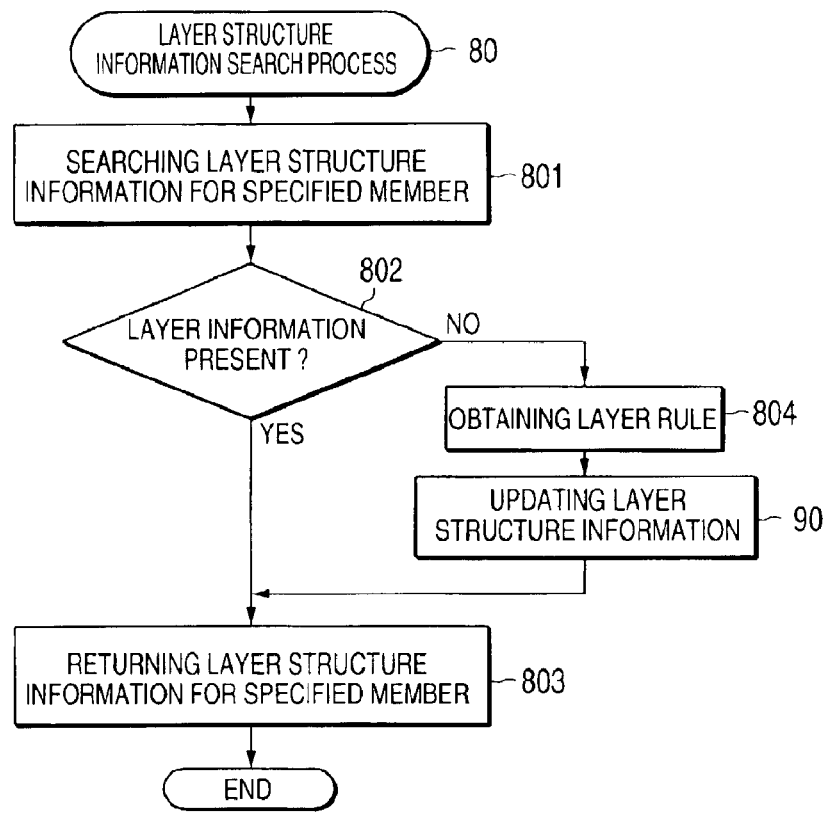
FIG. 6 is a flow chart illustrating steps involved in a preferred process of the layer structure information search process according to the current invention.

Now referring to FIG. 6, a flow chart illustrates steps involved in a preferred process of the layer structure information search process 80 according to the current invention. The layer structure information search process 80 is called in from the multidimensional data storage process 60 and the multidimensional data analysis process 70. In a step 801, the layer structure information management unit 15 refers to the layer structure information 43 and searches for the layer information of the specified member that is inputted via the terminal unit 6. In a step 802, it is determined whether or not the searched layer information has been registered. If the searched layer information exists, the preferred process proceeds to a step 803 where the searched layer information is returned. On the other hand, if the searched layer information is not registered or does not exist, the preferred process obtains the layer rule 42 in a step 804 and calls a layer structure information updating process 90 with the obtained layer rule 42 and the specified member before proceeding to the step 803. In the layer structure information updating process 90, the layer information is generated for the specified member, and the layer structure information 43 is updated before the generated layer information is returned to the layer structure information management unit 15. Finally, in a step 803, the layer structure information management unit 15 returns the received layer information to an original calling unit. The preferred process then terminates. The above described steps 802, 804 and 90 are the most characteristic processing according to the current invention. These steps enable to generate layer information according to the layer rule 42 even in response to an inquiry by an unregistered member. Since the layer structure information 43 is updated, no additional command is necessary for modifying the layer structure prior to or subsequent to a multidimensional data storage request.

Figure 7:
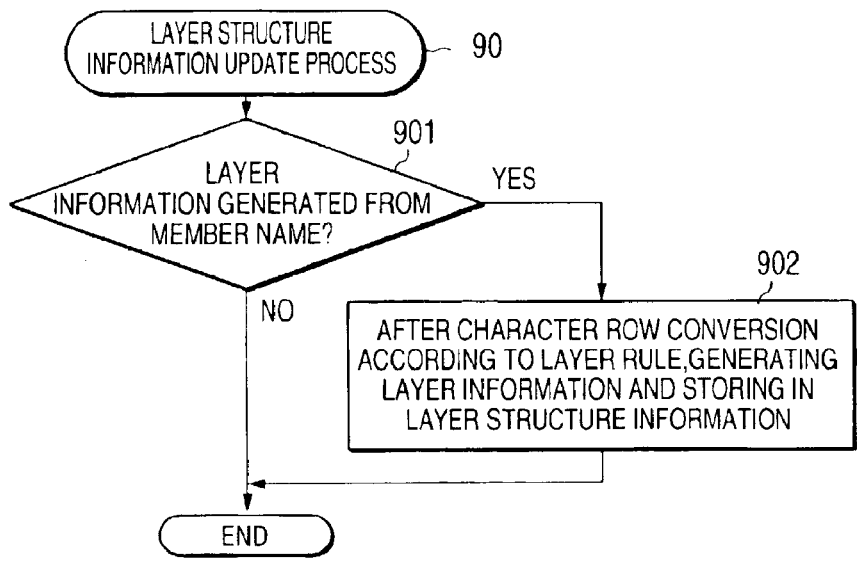
FIG. 7 is a flow chart illustrating steps involved in a preferred process of the layer structure information updating process according to the current invention.

Now referring to FIG. 7, a flow chart illustrates steps involved in a preferred process of the layer structure information updating process 90 according to the current invention. The layer rule 42 and the above specified member from the layer structure information management unit 15 are inputted to the layer structure information updating process 90. In a step 901, the layer structure information update unit 16 receives an instruction for layer information generation for the above specified member and examines the layer rule 42. If the layer information is not to be generated from the member name, the preferred process terminates. On the other hand, if the layer information is not to be generated from the member name, the layer structure information update unit 16 branches to a step 902. In the step 902, layer structure definition data is generated as the layer information by performing character row conversion according to the layer rule 42. Based upon the layer structure definition data, after the layer information of the above specified member is registered at the layer structure information 43, the above generated layer information is returned to the layer structure information management unit 15. The preferred process then terminates.

FIG. 8 illustrates exemplary layer rule definition data for the time dimension as used in a preferred embodiment according to the current invention. The layer rule definition data 3110 includes comments that are specified by a preceding pound sign, "#" on the first two lines as well as substantive information for generating other information. The third line indicates that the layer information is to be generated from the member name. In general, the following lines including the fourth line respectively indicate a generation method for each member at LEVEL 0, LEVEL 1 and LEVEL 2. In particular, the fourth line indicates that the member name is used without altering at the lowest member or LEVEL 0. The fifth line through the tenth line indicate the generation method for LEVEL 0. The sixth line through the ninth line specify replacement or conversion rules based on formal expressions. A new member name at LEVEL 2 is obtained by applying a character row conversion as expressed by the formal expressions to an input member name. For example, the formal expression on the seventh line is used to describe the above character row conversion process. If the fifth and sixth characters in the character row are "04", "05" or "06," a character row, "Q2" replaces them after the first or fourth character of the input member to obtain the character row conversion output. Assuming that an input member name is "199906," the LEVEL 1 member name becomes "1999Q2." The eleventh and thirteenth lines indicate that a row of the first through fourth characters is used without modification as a LEVEL 2 member name. For example, if an input member name is "199906," "1999" becomes the LEVEL 2 member name.

Figure 9:
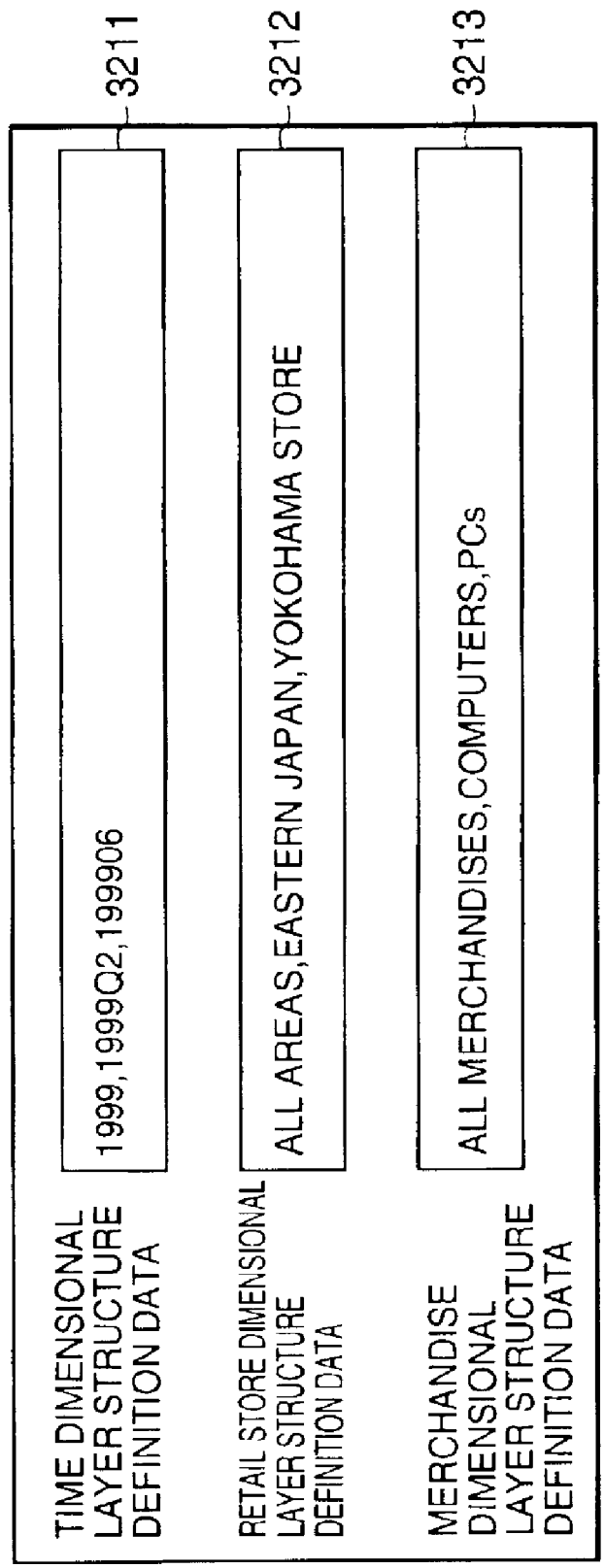
FIG. 9 is a diagram illustrating exemplary layer structure definition data for unregistered members as used in a preferred embodiment according to the current invention.

Now referring to FIG. 9, a diagram illustrates exemplary layer structure definition data for unregistered members as used in a preferred embodiment according to the current invention. The exemplary layer structure definition data is generated for storing data 3310 including unregistered data of FIG. 24. When the layer information is generated for the unregistered member 3311 of FIG. 24 based upon the layer rule definition data 3110 as shown in FIG. 8, the layer structure definition data 3211 is generated as layer information. Layer rule definition data for generating the layer structure definition data 3212 or 3212 will be described later.

Figure 24:
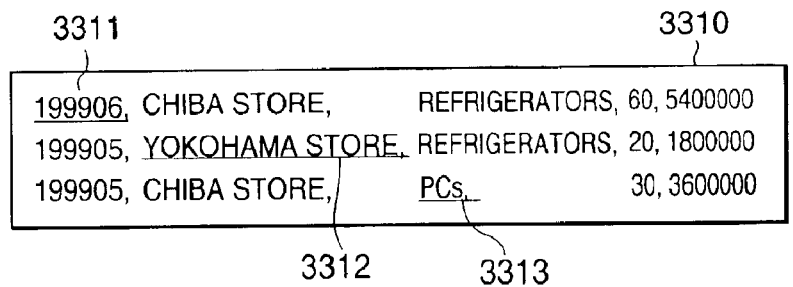
FIG. 24 is a diagram illustrating conventional exemplary data that includes members that are not registered in the layer structure information.
Figure 25:
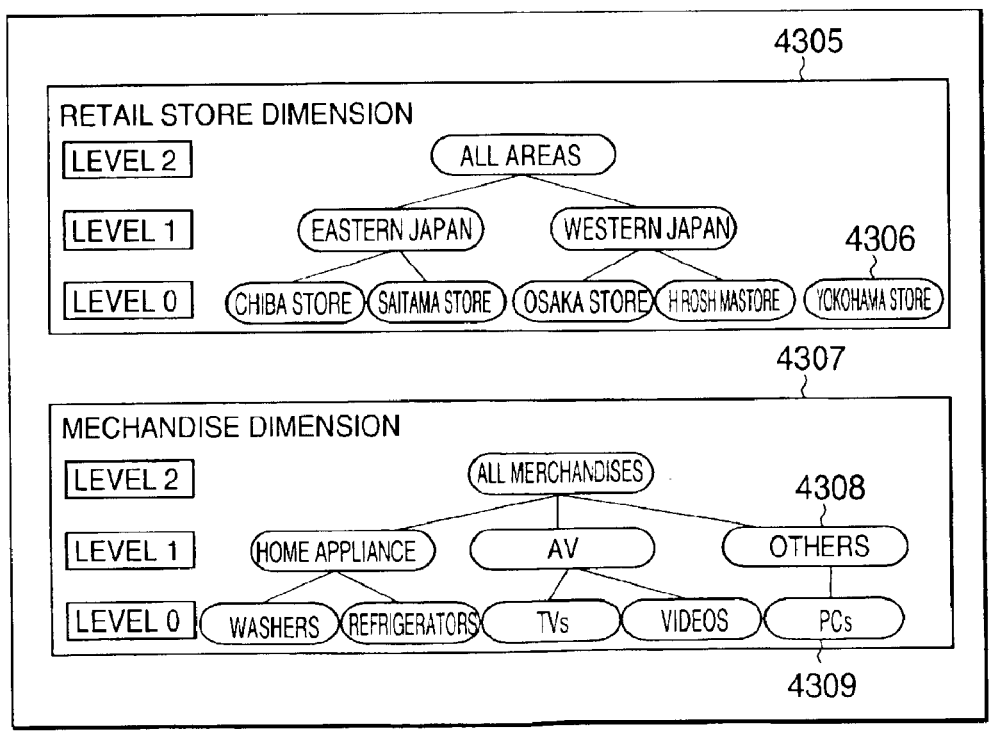
FIG. 25 is a diagram illustrating layer structure information for conventional data that includes members that are not previously registered in the layer structure information.

FIG. 10 is a diagram illustrating an example of the layer structure information 43 after being modified by a preferred embodiment according to the current invention. Layers 4311 through 4313 show the layer structure information 43 after the layer information of the unregistered members 3311 through 3313 of FIG. 24 is registered using the layer structure definition data 3211 through 3213 of FIG. 9. For definition data 3110 as shown in FIG. 8, the layer structure definition data 3211 is generated as layer information. Layer rule definition data for generating the layer structure definition data 3212 or 3213 will be described later.

Figure 20:
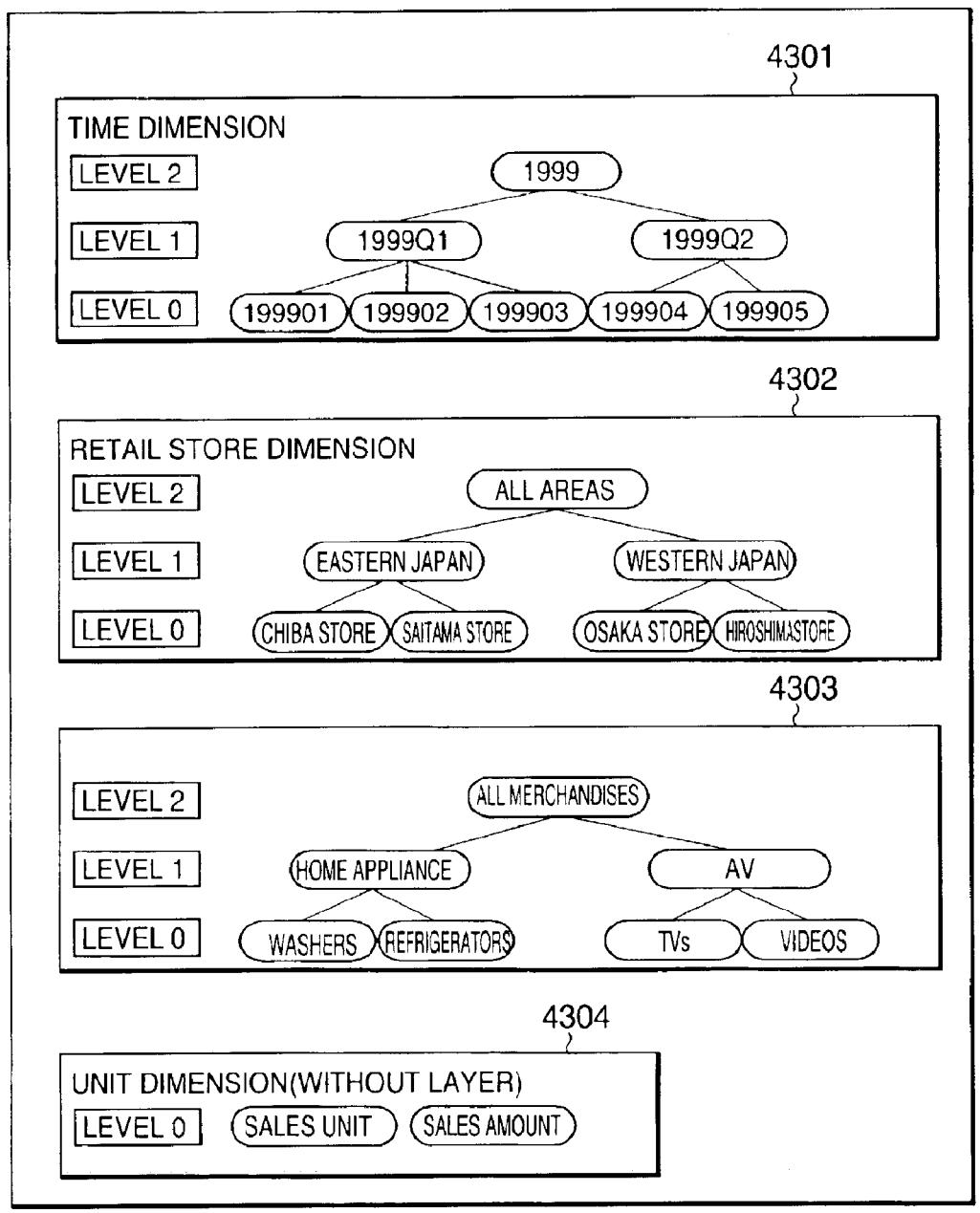
FIG. 20 is a diagram for describing conventional layer structure information storing layer information on members for each dimension.
Figure 21:
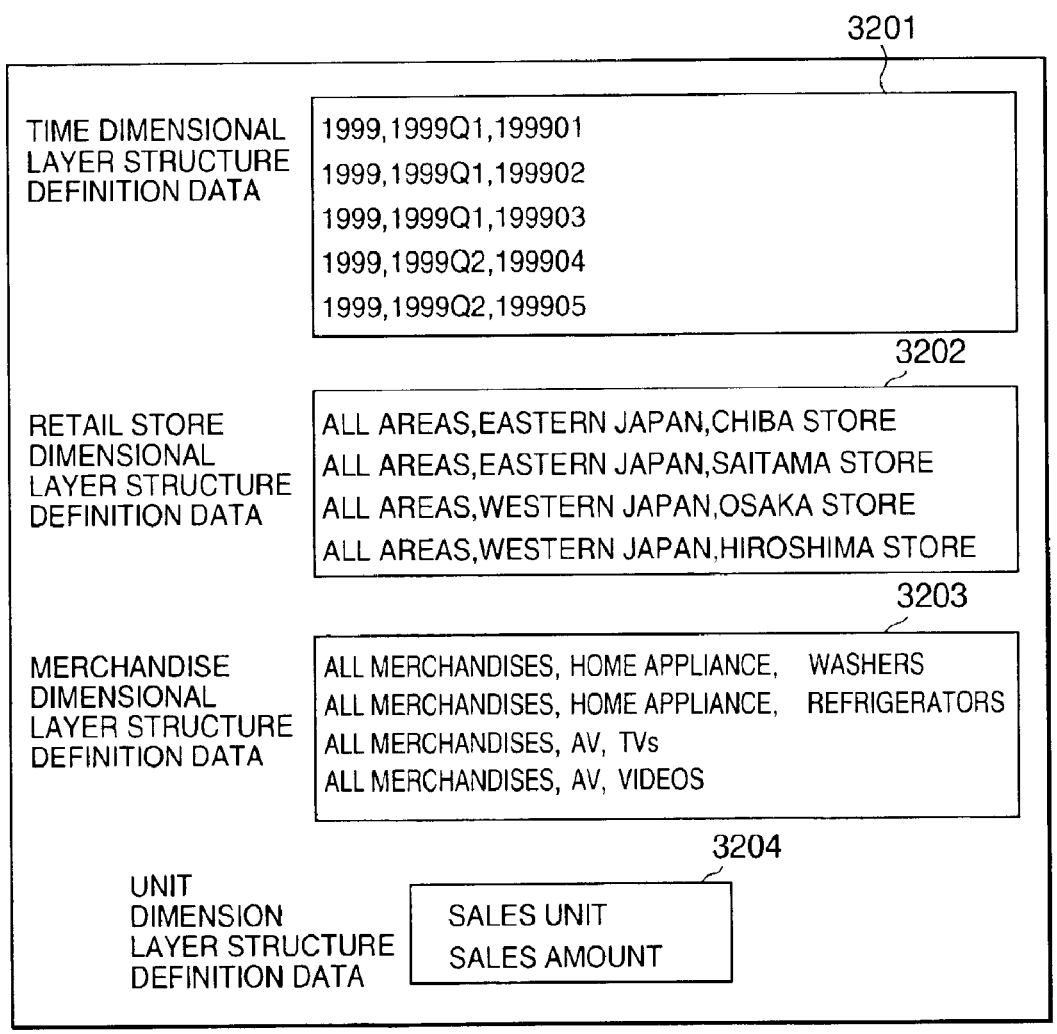
FIG. 21 is a diagram illustrating an example of conventional layer structure definition data.

FIG. 10 is a diagram illustrating an example of the layer structure information 43 after being modified by a preferred embodiment according to the current invention. Layers 4311 through 4313 show the layer structure information 43 after the layer information of the unregistered members 3311 through 3313 of FIG. 24 is registered using the layer structure definition data 3211 through 3213 of FIG. 9. For example, the layer 4301 as shown in FIG. 20 is registered at the layer structure information 43 of FIG. 1 and the layer rule definition data 3110 as illustrated in FIG. 8 is registered in the layer rule 42 of FIG. 1. When the member 3311 of the first record in the layer rule definition data 3110 is to be stored in the multidimensional database 44 of FIG. 1, it is detected that the member 3311 is unregistered. Upon the detection, the layer rule definition data 3110 is used to generate the layer structure definition data 3211 as shown in FIG. 9 for the above unregistered member, and the newly generated layer structure definition data 3211 is stored at the layer structure information 43. As a result, the time dimensional layer 4301 as shown in FIG. 20 changes to the time dimensional layer 4311 as shown in FIG. 10. As described above, the preferred embodiment according to the current invention generates the layer information for a specified member by converting a character row of a member name according to a predetermined formal expression. As illustrated in the example of the time dimension, the member name information is efficiently generated according to a predetermined rule and is stored at the layer structure information. Since the layer rule determines the layer information generation, the multidimensional database improves the management efficiency.

A second preferred embodiment of the multidimensional database system according to the current invention generates the layer information for an unregistered member based upon information obtained from the CSV formatted file. The second substantially identical to that of the first preferred embodiment except for the layer structure information update process 90A as shown in FIG. 13.

Now referring to FIG. 11, a diagram illustrates a portion of exemplary retail store dimensional layer rule definition in a preferred embodiment according to the current invention. The exemplary layer rule 42 includes the layer rule definition data 3120. The first two lines in the layer rule definition data 3120 are comments. The third line indicates that the layer information is to be generated from a file named "file 1" in the CSV format. The remaining three lines respectively indicate the correspondence between columns and the LEVEL 0 member, LEVEL 1 member and LEVEL 2 member.

Now referring to FIG. 12, a diagram illustrates a portion of exemplary data 3126 of a CSV-formatted file that is used in a preferred embodiment according to the current invention. The name of the above exemplary file is "file 1" and contains member names of the retail store dimension. In combination with the description on the fourth line in the layer rule definition data 3120 of FIG. 11, the retail store dimensional member layer information is generated. For example, given an unregistered member, "Yokohama store," the content of the file as shown in FIG. 12 is scanned to find a third record containing the unregistered member in the third column. As specified on the fifth and sixth lines of the layer rule definition data 3120, the members that correspond to LEVEL 1 and LEVEL 2 are respectively "Eastern Japan" and "All Areas" in the CSV-formatted data 3126. When there is more than one record that satisfy the requirement, one way to continue the preferred process is to interrupt as an error according to an user input or to issue an alarm. Alternatively, a predetermined rule selects one of the satisfactory records. For example, a first satisfactory record is chosen in the CSV-formatted file.

Now referring to FIG. 13, a flow chart illustrates steps involved in a second preferred process of the layer structure information updating process 90A according to the current invention. The layer rule 42 and the above specified member from the layer structure information management unit 15 are inputted to the layer structure information updating process 90A. In a step 9011, the layer structure information update unit 16 receives an instruction for layer information generation for the above specified member from the layer structure information management unit 15 and examines the layer rule 42. If the layer information is to be generated from a non-CSV-formatted file, the second preferred process terminates. On the other hand, if the layer information is to be generated from the CSV-formatted file, the preferred process branches to a step 9012. In the step 9012, one record is read in from the CSV-formatted file that is specified in the layer rule 42. In a step 9013, it is determined whether or not a column that is specified in the layer rule 42 contains the matching member name in the record. If a match is found in the step 9013, the layer structure definition data is generated as the layer information from the specified member of the record according to the layer rule 42 in a step 9014. In the step 9014, by using the generated layer structure definition data, the layer information of the specified member is also stored in the layer structure information 43, and the above generated layer information is returned from the layer structure information management unit 15. On the other hand, if there is no match, the second preferred process proceeds to a step 9015, where it is determined whether or not a file end has reached. Upon failing to reach a file end, the second preferred process goes back to the step 9012 to repeat the above steps. Upon reaching the file end, a step 9016 performs an error handling procedure such as issuing an error message. The second preferred embodiment then terminates.

As described above, in the second preferred process, the multidimensional database improves the management efficiency. For example, the layer 4302 as shown in FIG. 20 is registered at the layer structure information 43 of FIG. 1 and the retail store dimension layer rule definition data 3120 as illustrated in FIG. 11 is registered in the layer rule 42 of FIG. 1. When the member 3312 of the second record in the layer rule definition data 3120 is to be stored in the multidimensional database 44 of FIG. 1, it is detected that the member 3312 or "Yokohama store" is unregistered. Upon the detection, the layer rule definition data 3120 is used to generate the layer structure definition data 3212 as shown in FIG. 9 for the above unregistered member, and the newly generated layer structure definition data 3212 is stored at the layer structure information 43. As a result, the retail store dimensional layer 4302 as shown in FIG. 20 changes to the retail store dimensional layer 4312 as shown in FIG. 10. As described above, the preferred embodiment according to the current invention generates the layer information for a specified member by using a predetermined file containing sequentially placed members of each layer. As illustrated in the example of the retail store dimension, the member name information is efficiently generated according to a predetermined rule and is stored at the layer structure information. Since the layer rule determines the layer information generation, the multidimensional database improves the management efficiency.

Figure 17:
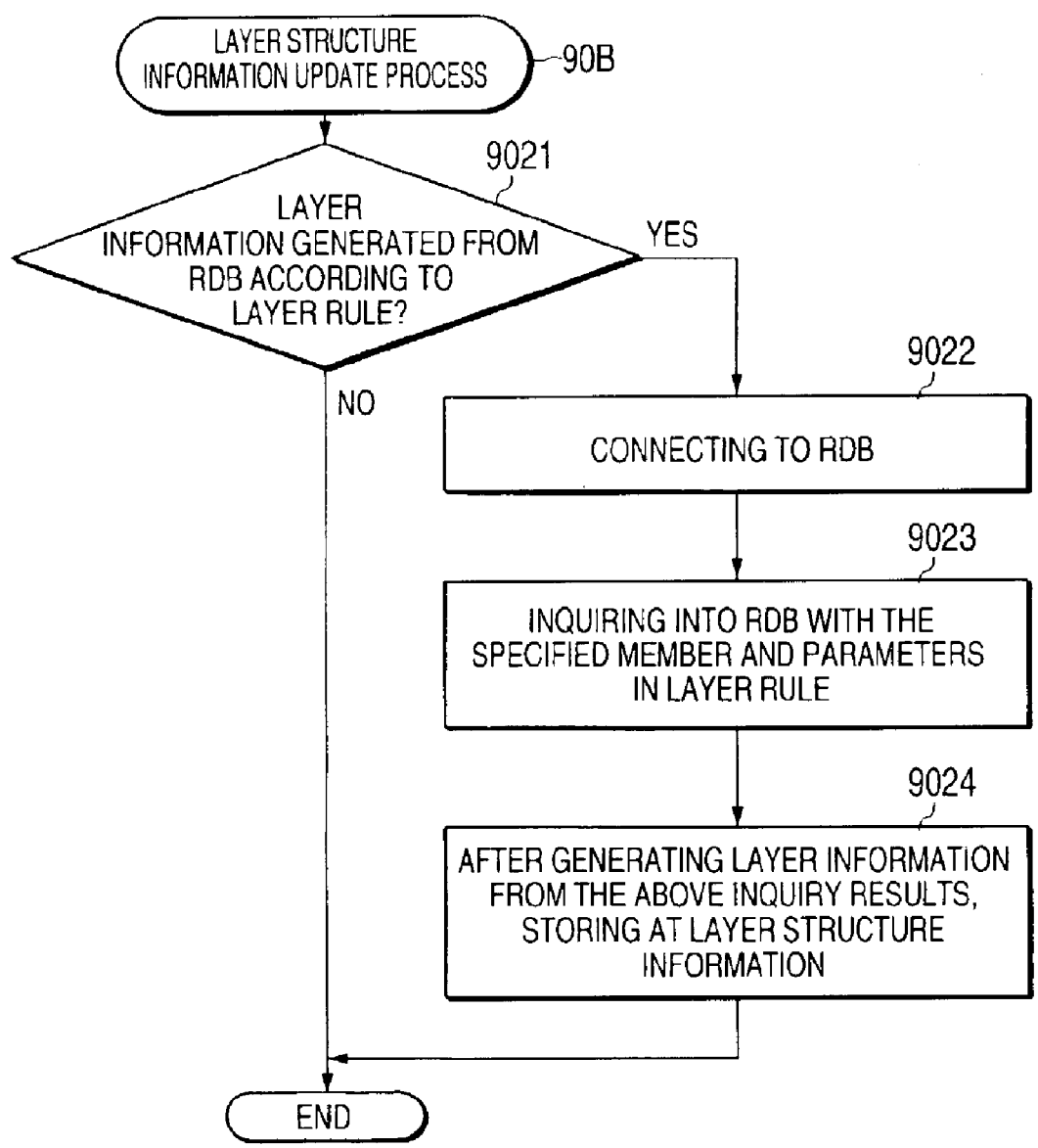
FIG. 17 is a flow chart illustrating steps involved in a third preferred process of the layer structure information updating process according to the current invention.

A third preferred embodiment of the multidimensional database system according to the current invention generates the layer information for an unregistered member based upon information obtained from relational databases (RDB). The third preferred embodiment generally relies upon information to recognize a RDB containing relevant layer information and additional information on the RDB data format. After accessing the above described information from the RDB, the third preferred embodiment utilizes the layer rule 42 which specifies to generate the layer information and to store it at the layer structure information 43. One example of the layer rule 42 is merchandise dimensional layer rule definition data. Based upon the layer information obtained according to the specified format in the RDB specified in the layer rule 42, the layer information is generated for an unregistered member and is stored at the layer structure information 43. In general, the above process for the third preferred embodiment is substantially identical to that of the first preferred embodiment except for the layer structure information update process 90B as shown in FIG. 17.

Figure 14:
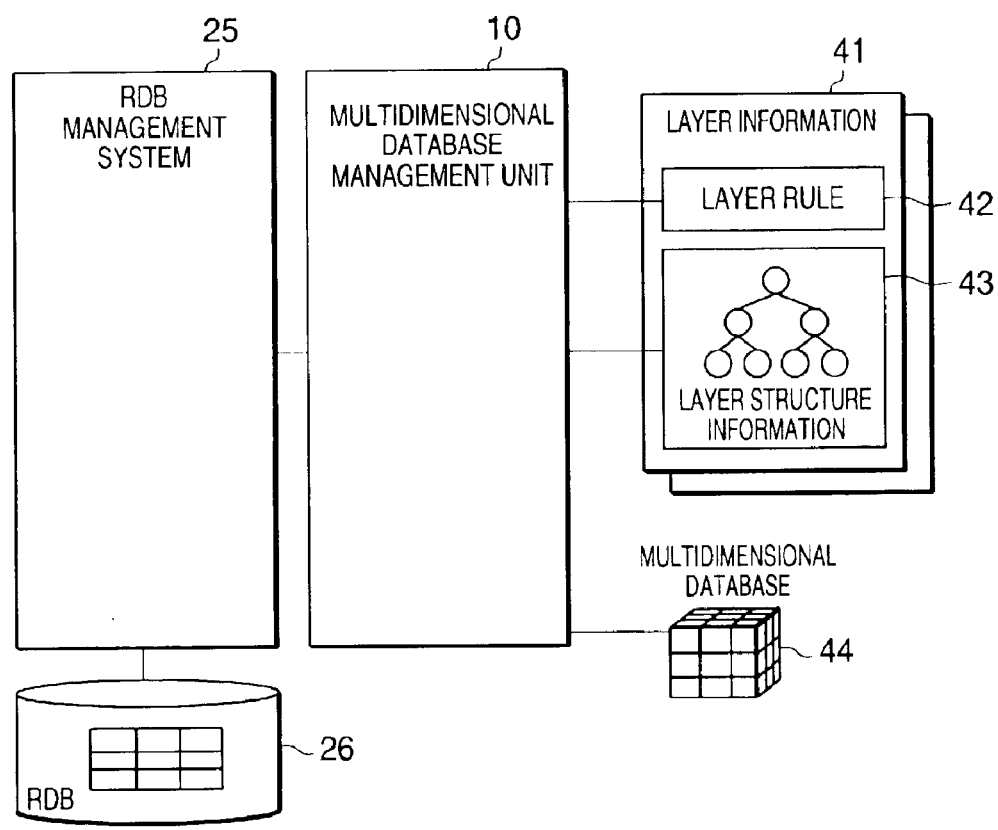
FIG. 14 is a diagram illustrating the preferred embodiment of the multidimensional database system according to the current invention.

Now referring to FIG. 14, a diagram illustrates the third preferred embodiment of the multidimensional database system according to the current invention. In the third preferred embodiment, a multidimensional database management unit 10 is connected to a RDB management system 25 and has access to a RDB 26 via a predetermined set of procedures. In the third preferred embodiment, the multidimensional generated for an unregistered member and is stored at the layer structure information 43. In general, the above process for the third preferred embodiment is substantially identical to that of the first preferred embodiment except for the layer structure information update process 90B as shown in FIG. 17.

Now referring to FIG. 14, a diagram illustrates the third preferred embodiment of the multidimensional database system according to the current invention. In the third preferred embodiment, a multidimensional database management unit 10 is connected to a RDB management system 25 and has access to a RDB 26 via a predetermined set of procedures. In the third preferred embodiment, the multidimensional database management unit 10 is further connected to the dimensional layer information 41 and the multidimensional database 44 as shown in the first preferred embodiment with respect to FIG. 1. The dimensional layer information 41 further includes the layer rule 42 as well as the layer structure information 43.

Now referring to FIG. 15, a diagram illustrates a portion of merchandise dimensional layer rule definition data 3130 that is used in the third preferred embodiment according to the current invention. The exemplary layer rule 42 includes the above layer rule definition data 3130. The first two lines in the layer rule definition data 3130 are comments. The third line indicates that the layer information is to be generated from a data table named "Product Master Table." The fourth and fifth lines respectively indicate the correspondence of the LEVEL 0 members and LEVEL 1 members in the above specified list. The sixth line indicates that the LEVEL 2 member is "All Products" or "All Merchandise."

Now referring to FIG. 16, a diagram illustrates an exemplary RDB product master table for the RDB that is used in the third preferred embodiment according to the current invention. The RDB product master table stores member names on the merchandise dimension in the RDB 26. In combination with the information on the fourth and the following lines in the layer rule definition data 3130 of FIG. 15, the layer information is generated for the merchandise dimension. For example, given an unregistered member, "PCs," the RDB 26 is searched to obtain a record 261 whose data value for the small classification is "PCs." The fifth and the sixth lines in the layer rule definition data 3130 of FIG. 15 specify the LEVEL 1 and LEVEL 2 members that correspond to "computers" and "all merchandises."

Now referring to FIG. 17, a flow chart illustrates steps involved in a third preferred process of the layer structure information updating process 90B according to the current invention. The layer rule 42 and the above specified member from the layer structure information management unit 15 are inputted to the layer structure information updating process 90B. In a step 9021, the layer structure information update unit 16 receives an instruction for layer information generation for the above specified member from the layer structure information management unit 15 and examines the layer rule 42. If the hierarchy rule 42 is not defined that the hierarchical information is to be generated from RDB 26, the third preferred process terminates. On the other hand, if the layer information is to be generated from the RDB 26, the third preferred process branches to a step 9022. In the step 9022, the RDB management system 25 is connected based upon a predetermined procedure. In a step 9023, an inquiry is made to the RDB 26 based upon the above specified member and the parameters that are specified in the layer rule 42. In the step 9024, the layer structure definition data is generated as the layer information of the specified member from the inquiry results according to the layer rule 42. In the step 9024, by using the generated layer structure definition data, the layer information of the specified member is also stored in the layer structure information 43, and the above generated layer information is returned to from the layer structure information management unit 15. The third preferred process then terminates.

As described above, in the third preferred process, the multidimensional database improves the management efficiency. For example, the layer 4303 as shown in FIG. 20 is registered at the layer structure information 43 of FIG. 1 and the retail store information is efficiently generated according to a predetermined rule and is stored at the layer structure information. Since the layer rule determines the layer information generation, the multidimensional database improves the management efficiency.

Figure 18:
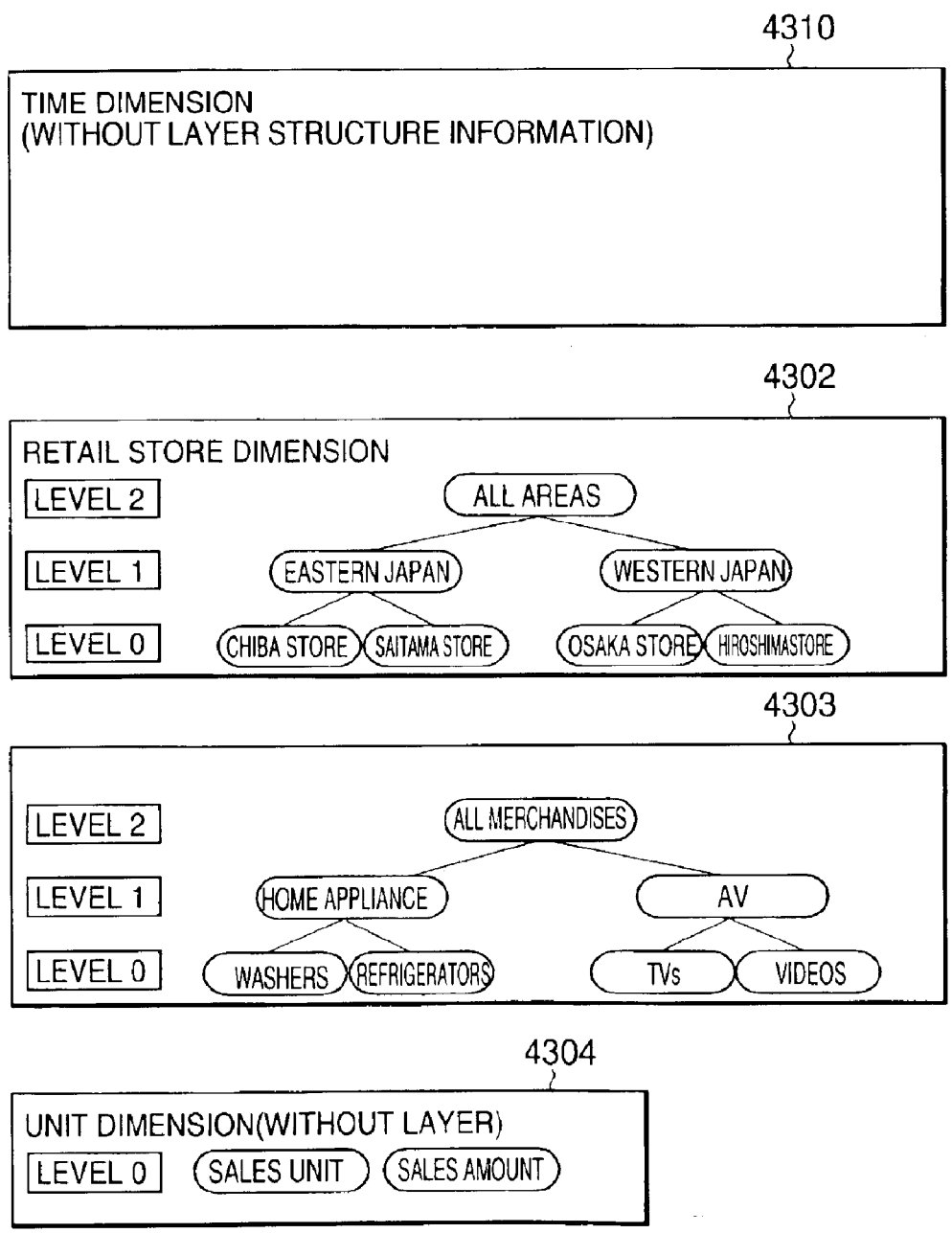
FIG. 18 is a diagram illustrating exemplary layer structures respectively for the three dimensions that are to be used with the fourth preferred embodiment according to the current invention.

A fourth preferred embodiment of the multidimensional database system according to the current invention generates the layer information for an unregistered member without layer structure information based upon a registered layer rule. For the lack of the layer structure information 43, the fourth preferred embodiment newly generates the layer structure information 43 for each dimension and the layer information for unregistered members according to the layer rule 42. Then, the newly generated layer information is stored at the newly generated layer structure information 43. To further illustrate the fourth preferred embodiment, the example for the first preferred embodiment is used to describe that the time dimension layer 4301 as shown in FIG. 20 is modified to the layer 4310 as shown in FIG. 18. Similarly, the same example is used to describe that the data 3310 as shown in FIG. 24 is modified to the data 3301 as shown in FIG. 22.

Now referring to FIG. 18, a diagram illustrates exemplary layer structures respectively for the three dimensions that are to be used with the fourth preferred embodiment according to the current invention. In the time dimension layer 4310, no layer structure information has been registered, and the layer structure information 43 lacks the time dimension. Assuming that layer rule definition data 3110 as shown in FIG. 8 is registered as the layer rule 42 for the time dimension, when a storage request is issued for storing the data 3301 as shown in FIG. 22, the system control process 110 as shown in FIG. 2 sequentially transfers its control to the multidimensional data storage process 60 as shown in FIG. 4, the layer structure information search process 80 as shown in FIG. 6 and the layer structure information update process 90 as shown in FIG. 7. Using the same example, when the first record of the data 3301 is stored at the multidimensional database, although the time dimension member data, "199901" is read in, since the time dimension layer 4310 lacks the layer structure information 43 and the layer information is not registered, the member is considered to be unregistered in the step 801 as shown in FIG. 6. The fourth preferred process then proceeds to the step 804 to obtain the layer rule definition data 3110 such as shown in FIG. 8 as the layer rule 42. In the layer structure information update process 90, the layer rule definition data 3110 is applied to the member value, "199901" to generate the layer information via the character row conversion.

Figure 19:
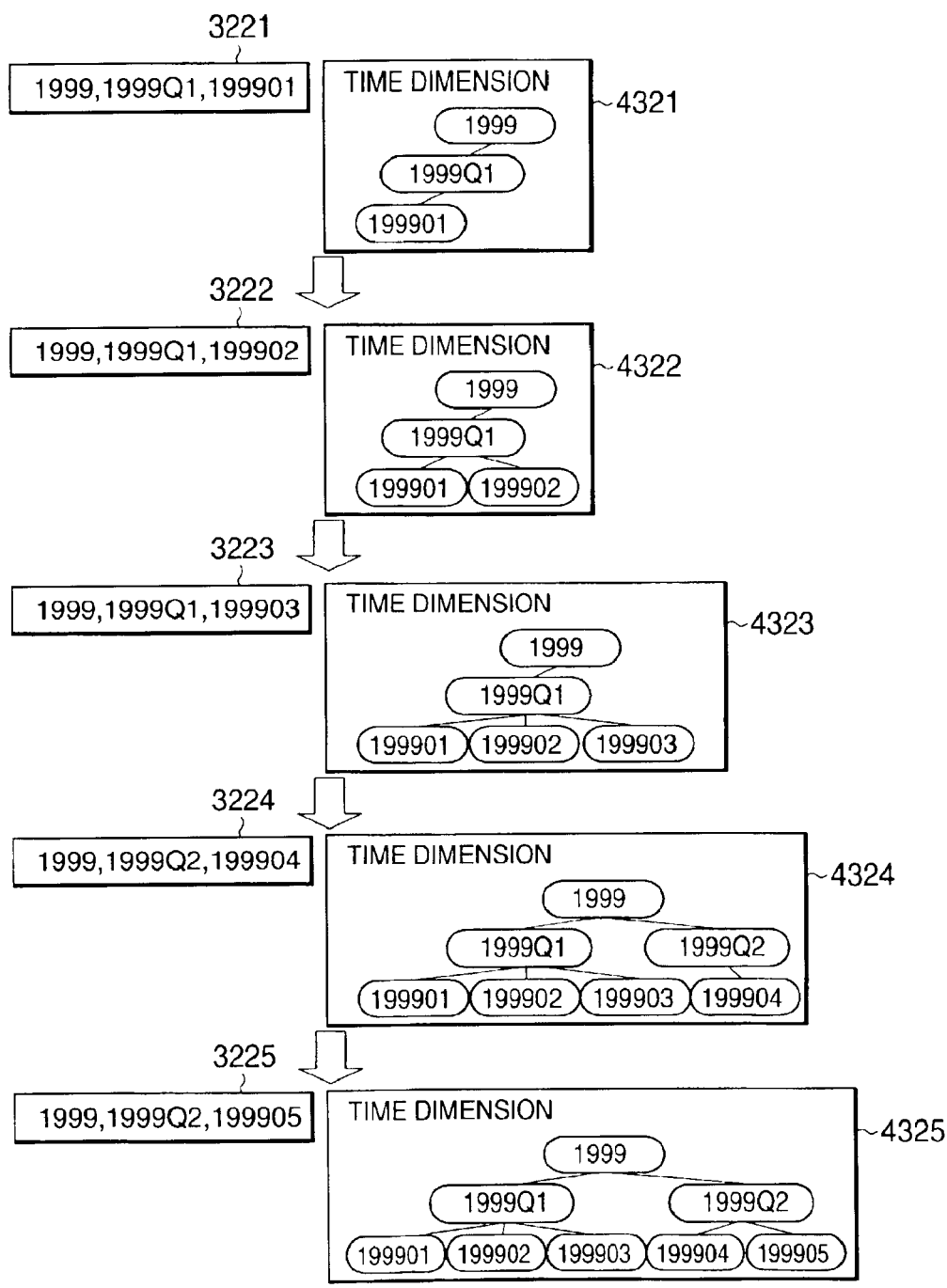
FIG. 19 is a diagram illustrating changes in the layer information or the layer structure as the fourth preferred process is performed according to the current invention.

Now referring to FIG. 19, a diagram illustrates changes in the layer information or the layer structure as the fourth preferred process is performed according to the current invention. In the layer structure information update process 90, after the time dimensional layer structure information 43 is newly generated, the layer information 3221 is generated by applying the layer rule definition data 3110. The layer information 3221 is stored as a time dimensional layer 4321 at the newly generated time dimensional layer structure information 43. As a result, the member "199901" is no longer unregistered and is now treated as a registered member in the time dimensional layer 4321. Similarly, after the first and second records of the data 3301 as shown in FIG. 22 are stored, the third record is processed. Since the layer structure information 43 for the time dimension is as shown in the layer 4321, the time dimensional member, "199902" is regarded as unregistered. For this reason, the layer structure information update process 90 generates the layer information 3222 and registers the layer information 3222 as the time dimensional layer 4322 in the information structure information 43. Furthermore, when the fifth, sixth and seventh records of the data 3301 as shown in FIG. 22 are processed, the time dimensional members, "199903," "199904" and "199905" are regarded as unregistered. For this reason, the layer structure information update process 90 generates the layer information 3223, 3224 and 3225 and sequentially registers these layer information 3222, 3224 and 3225 as the time dimensional layers 4323, 4324 and 4325 in the information structure information 43. As described above, the fourth preferred embodiment according to the current invention generates the layer structure information 43 if it does not exist and the layer information for a specified member according to the layer rule 42. The preferred embodiment then stores the newly generated layer information at the newly generated layer structure information 43. Because of the above features, even when the multidimensional database 44 is newly created, the layer member information is automatically generated for each dimension based upon the layer rule 42 and the data to be stored. Since the layer rule determines the layer information generation, the multidimensional database improves the management efficiency.

A fifth preferred embodiment of the multidimensional database system according to the current invention generates the layer information for an unregistered member without layer structure information based upon a plurality of registered layer rules. The fifth preferred embodiment relates one main layer rule for a dimension to more than one sub-layer rules. The sublayer rules have substantially the same functions as described with respect to the first through third preferred embodiments. The main layer rule includes information for recognizing the sub-layer rules and specifies the sequential application of the sub-layer rules for a success. The fifth preferred embodiment will be further illustrated by the example of changing the retail store dimensional layer rule definition data 3120 as shown in FIG. 11 to layer rule definition data 3140, 3141 and 3142 as shown in FIG. 26. The fifth preferred embodiment will be also further illustrated by the example of changing the data 3310 as shown in FIG. 24 to data 3340 as shown in FIG. 27.

Now referring to FIG. 26, a diagram illustrates a portion of retail store dimensional layer rule definition data 3140 that is used in the fifth preferred embodiment according to the current invention. The retail store dimension layer rule definition data is in a main layer rule 3140. Other sub layer definition data is in sub-layer rules 3141 and 3142. The first two lines in the main layer rule 3140 indicate comments. A third line indicates the application of a first sub-layer rule called "Store_Rule 1." Similarly, a fourth line indicates the application of a second sublayer rule called "Store_Rule 2." The application of these sub-layer rules is sequential and follows the above order. The layer rule definition data 3141 is substantially similar to the one as described with respect to FIG. 11 for the second preferred embodiment. The layer rule will be referred to as "Store_Rule 1." The layer rule definition data 3142 is substantially similar to the one as described with respect to FIG. 8 for the first preferred embodiment. The layer rule will be referred to as "Store_Rule 2."

Now referring to FIG. 27, a diagram illustrates a portion of data that is to be stored in the multidimensional database 44 in the fifth preferred embodiment according to the current invention. Each record in the data 3340 has five fields. The first three fields are time dimension, retail store dimension and merchandise dimension in order. The remaining two fields are cell values for sales number and sales amount in the unit dimension.

Figure 28:
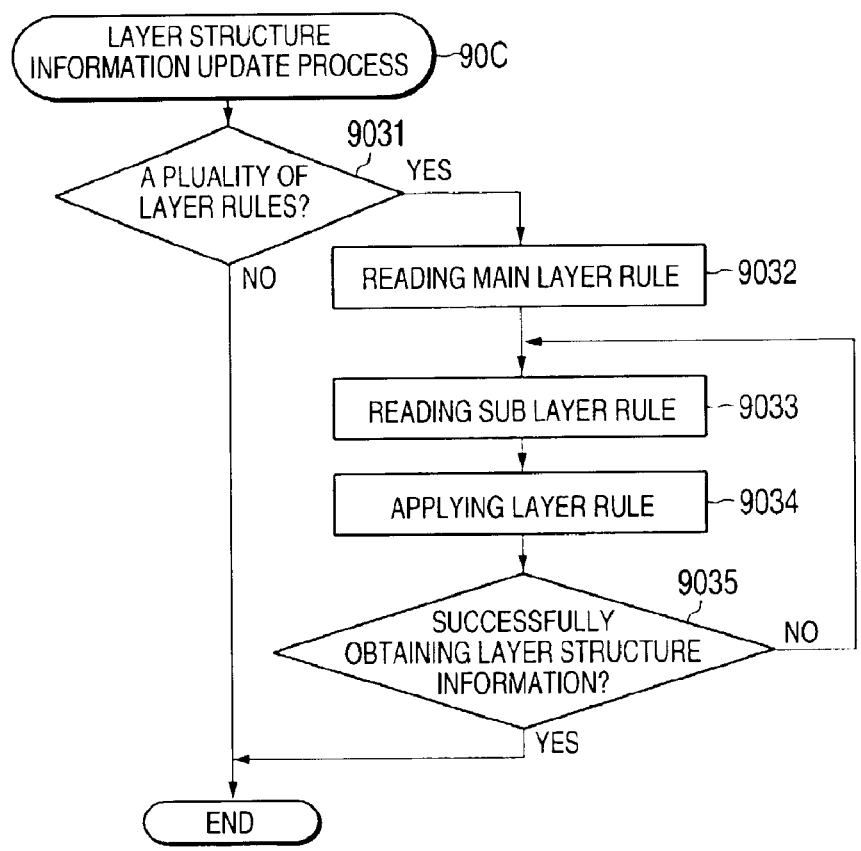
FIG. 28 is a flow chart illustrating steps involved in a fifth preferred process of the layer structure information updating process according to the current invention.

Now referring to FIG. 28, a flow chart illustrates steps involved in a fifth preferred process of the layer structure information updating process 90C according to the current invention. The layer rule 42 and the above specified member from the layer structure information management unit 15 are inputted to the layer structure information updating process 90C. In a step 9031, the layer structure information update unit 16 receives an instruction for layer information generation for the above specified member from the layer structure information management unit 15 and determines whether or not the layer rule 42 has a plurality of rules. If the layer rule is not plural, the fifth preferred process terminates. On the other hand, if the layer rule is plural, the fifth preferred process branches to a step 9032. In the step 9032, the main layer rule is read in. In a step 9033, sub-layer rules are sequentially read in from the above main layer rule that has been read in the step 9032. In the step 9034, the sub layer rules are applied. In the step 9035, it is determined whether or not the results from the step 9034 have successfully obtained the layer structure information. If the results are successful in the step 9035, the fifth preferred process terminates. On the other hand, if the results are not successful in the step 9035, the fifth preferred process returns to the step 9033 to repeat the steps 9033 and 9034.

Figure 29:
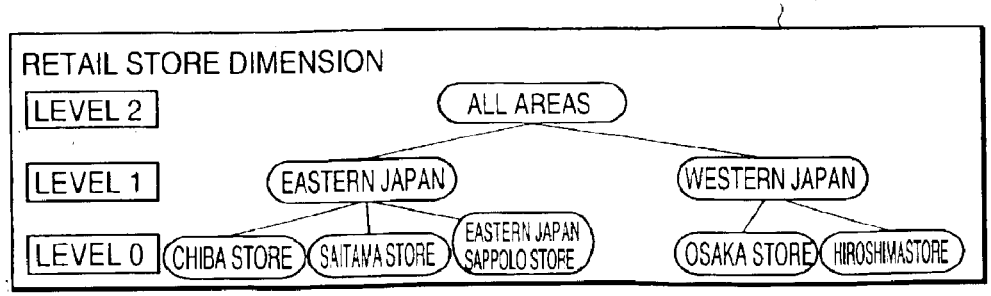
FIG. 29 illustrates that the change from the retail store dimension layer 4302 as shown in FIG. 20 to the final retail store dimension layer 4330.

When the retail store dimensional layer 4302 is registered in the layer structure information 43 as shown in FIG. 20, the retail store dimensional layer definition data 3140, 3141 and 3142 as shown in FIG. 26 are registered at the layer rule 42. When the data 3340 as shown in FIG. 27 is stored in the multidimensional database 44, a first record "Eastern Japan Sapporo Store" in the data 3340 is recognized as an unregistered member and the first sub-layer rule or the layer rule definition data 3141 of the layer rule definition data 3140 is applied in a first attempt. Although the layer rule definition data 3141 instructs to read the file 1 in the CSV format, since "Eastern Japan Sapporo Store" is not found by scanning the file contents 3126 as shown in FIG. 12, the application of the layer rule definition data 3140 fails. Subsequently, the second sub-layer rule or the layer rule definition data 3142 of the layer rule definition data 3140 is applied in a second attempt. The layer rule definition data 3142 generates the layer structure information by performing the character row conversion as described with respect to the first preferred embodiment. Using the exemplary input member name of "Eastern Japan Sapporo Store," the fourth line in the layer rule definition data 3142 indicates that the name of the input member becomes the Level 0 member name. The fifth through seventh lines indicate that if the second word is "Japan," the first and second words "Eastern Japan" become the Level 1 member name. The eighth through tenth lines indicate that "all sales territories" becomes the Level 2 member name without any restriction. As the result of the above described character row conversion, "all sales territories," "Eastern Japan" and "Eastern Japan Sapporo Store" have been generated as new layer information. The newly generated layer information is registered in the layer structure information 43. Finally, the retail store dimension layer 4302 as shown in FIG. 20 becomes the retail store dimension layer 4330 as shown in FIG. 29. As described above, the fifth preferred embodiment according to the current invention generates the layer structure information 43 by subsequently applying the sub-layer rules of the main layer rule for a specified member. As in the retail store dimension members, some member names are arbitrarily determined by the users while other member names are determined by a predetermined rule. In the above mixed situation, the member structure information is efficiently generated. Since the layer rule determines the layer information generation, the multidimensional database improves the management efficiency.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A multidimensional database control system, comprising:
    a data storage unit for storing layer rule definition data, layer structure definition data, database data, input data, layer structure information and layer rule including rules for character-row converting a name of a member and for generating layer information;
    a layer rule management unit connected to said data storage unit for managing the layer rule based upon the layer rule definition data;
    a layer structure information management unit connected to said data storage unit and said layer rule management unit for managing the layer structure information based upon the layer structure definition data;
    a multidimensional database management unit connected to said data storage unit for inputting the input data in the database data; and
    a layer structure information update unit connected to said layer structure information management unit and said multidimensional database management unit for receiving a command to generate layer information for the input data and for registering the layer information at the layer structure information, wherein said multidimensional database management unit enters the input data based upon the layer information.

2. The multidimensional database control system according to claim 1 wherein the rules are expressed in regular expression.

3. The multidimensional database control system according to claim 1 wherein the layer rule includes an identifier of a file and descriptions of a predetermined format, the file containing a source for generating the corresponding layer information.

4. The multidimensional database control system according to claim 3 wherein said layer structure information update unit accesses the file to obtain hierarchical information.

5. The multidimensional database control system according to claim 1 wherein the layer rule includes an identifier of a database and descriptions of a predetermined format, the database containing a source for generating the corresponding layer information.

6. The multidimensional database control system according to claim 5 wherein layer structure information update unit accesses the database to obtain the source.

7. The multidimensional database control system according to claim 1 wherein said layer structure information management unit determines whether or not the layer structure information exists, in the absence of the layer structure information, said layer structure information management unit generating the layer structure information that represents the input data in the multidimensional database.

8. The multidimensional database control system according to claim 1 wherein the layer rule further comprises a main layer rule and a plurality of sub-layer rules, said layer structure information management unit generating the layer information according to a sequential application of the main layer rule and the plurality of the sub-layer rules, said layer structure information management unit determining whether or not the layer information is successfully generated.

9. The multidimensional database control system according to claim 1 further comprising an input unit connected to said layer structure information management unit for inputting the input data, said layer structure information management unit returning the layer information to said input unit subsequent to registering the layer information.

10. A multidimensional database control method, comprising the steps of:
    storing layer rule definition data, layer structure definition data, database data, input data, layer structure information and layer rule for a multidimensional database, wherein the layer rule includes rules for character-row converting a name of a member and for generating layer information;
    maintaining the layer rule based upon the layer rule definition data;
    maintaining the layer structure information based upon the layer structure definition data;
    inputting the input data in the database data;
    generating layer information for the input data based upon the layer rule, the input data and the layer structure information;
    registering the layer information at the layer structure information; and
    entering the input data in the multidimensional database based upon the layer structure information.

11. The multidimensional database control method according to claim 10 wherein the rules are expressed in regular expression.

12. The multidimensional database control method according to claim 10 wherein the layer rule includes an identifier of a file and descriptions of a predetermined format, the file containing a source for generating the corresponding layer information.

13. The multidimensional database control method according to claim 12 further comprising a step of accessing the file to obtain hierarchical information.

14. The multidimensional database control method according to claim 10 wherein the layer rule includes an identifier of a database and descriptions of a predetermined format, the database containing a source for generating the corresponding layer information.

15. The multidimensional database control method according to claim 14 further comprising a step of accessing the database to obtain the source.

16. The multidimensional database control method according to claim 10 further comprising a step of determining whether or not the layer structure information exists, in the absence of the layer structure information, generating the layer structure information that represents the input data in the multidimensional database.

17. The multidimensional database control method according to claim 10 wherein the layer rule further comprises a main layer rule and a plurality of sub-layer rules and further comprising additional steps of:

generating the layer information according to a sequential application of the main layer rule and the plurality of the sub-layer rules; and determining whether or not the layer information is successfully generated.

18. The multidimensional database control method according to claim 10 further comprising additional steps of:

inputting the input data; and returning the layer information subsequent to registering the layer information.

19. A computer program for managing a multidimensional database, performing the steps of:

storing layer rule definition data, layer structure definition data, database data, input data, layer structure information and layer rule for a multidimensional database, wherein the layer rule includes rules for character-row converting a name of a member and for generating layer information;

maintaining the layer rule based upon the layer rule definition data;

maintaining the layer structure information based upon the layer structure definition data, inputting the input data in the database data;

generating layer information for the input data based upon the layer rule, the input data and the layer structure information;

registering the layer information at the layer structure information; and entering the input data in the multidimensional database based upon the layer structure information.

20. The computer program for managing a multidimensional database according to claim 19 wherein the rules are expressed in regular expression.

21. The computer program for managing a multidimensional database according to claim 19 wherein the layer rule includes an identifier of a file and descriptions of a predetermined format, the file containing a source for generating the corresponding layer information.

22. The computer program for managing a multidimensional database according to claim 21 further comprising a step of accessing the file to obtain hierarchical information.

23. The computer program for managing a multidimensional database according to claim 19 wherein the layer rule includes an identifier of a database and descriptions of a predetermined format, the database containing source for generating the corresponding layer information.

24. The computer program for managing a multidimensional database according to claim 23 further comprising a step of accessing the database to obtain the source.

25. The computer program for managing a multidimensional database according to claim 19 further comprising a step of determining whether or not the layer structure information exists, in the absence of the layer structure information, generating the layer structure information that represents the input data in the multidimensional database.

26. The computer program for managing a multidimensional database according to claim 19 wherein the layer rule further comprises a main layer rule and a plurality of sub-layer rules and further comprising additional steps of:

generating the layer information according to a sequential application of the main layer rule and the plurality of the sub-layer rules; and determining whether or not the layer information is successfully generated.

27. The computer program for managing a multidimensional database according to claim 19 further comprising additional steps of:

inputting the input data; and returning the layer information subsequent to registering the layer information.

* * * * *